(12) United States Patent
Kelley et al.

(10) Patent No.: US 7,239,705 B2
(45) Date of Patent: Jul. 3, 2007

(54) APPARATUS AND METHOD FOR BROADCAST SERVICES TRANSMISSION AND RECEPTION

(75) Inventors: Sean S. Kelley, Hoffman Estates, IL (US); William P. Alberth, Jr., Crystal Lake, IL (US); Brian K. Classon, Palatine, IL (US); Dah-Lain Almon Tang, Naperville, IL (US)

(73) Assignee: Motorola Inc., Schaumburg, IL (US)

( * ) Notice: Subject to any disclaimer, the term of this patent is extended or adjusted under 35 U.S.C. 154(b) by 287 days.

(21) Appl. No.: 10/732,757

(22) Filed: Dec. 10, 2003

(65) Prior Publication Data

US 2005/0129231 A1 Jun. 16, 2005

(51) Int. Cl.
*H04N 7/167* (2006.01)

(52) U.S. Cl. ...................... 380/239; 380/231

(58) Field of Classification Search .................. 726/6, 726/7, 5, 30, 27, 35, 4, 19, 18, 17; 380/231, 380/239

See application file for complete search history.

(56) References Cited

U.S. PATENT DOCUMENTS

| | | | | |
|---|---|---|---|---|
| 4,323,921 A | * | 4/1982 | Guillou | 705/53 |
| 4,354,201 A | * | 10/1982 | Sechet et al. | 380/228 |
| 5,758,068 A | * | 5/1998 | Brandt et al. | 726/27 |
| 6,097,816 A | * | 8/2000 | Momiki et al. | 380/210 |
| 6,343,280 B2 | * | 1/2002 | Clark | 705/55 |
| 2002/0001386 A1 | * | 1/2002 | Akiyama | 380/201 |
| 2002/0164025 A1 | * | 11/2002 | Raiz et al. | 380/231 |
| 2003/0039361 A1 | | 2/2003 | Hawkes et al. | |

* cited by examiner

*Primary Examiner*—Matthew Smithers
(74) *Attorney, Agent, or Firm*—Matthew C. Loppnow

(57) ABSTRACT

A method and apparatus for broadcast services transmission and reception. Reception of a broadcast multicast transmission is requested. Preliminary short time updated key information is transmitted or received prior to transmitting or receiving a broadcast subscription key for the requested broadcast services transmission. An encrypted broadcast services transmission is transmitted or received. The encrypted broadcast services transmission is encrypted or decrypted using the preliminary short time updated key information.

32 Claims, 17 Drawing Sheets

APPARATUS AND METHOD FOR BROADCAST SERVICES TRANSMISSION AND RECEPTION

BACKGROUND

1. Field

The present disclosure is directed to a method and apparatus for broadcast services transmission and reception. More particularly, the present disclosure is directed to providing broadcast services transmission and reception utilizing keys for encryption and decryption.

2. Description of Related Art

Presently, it is predicted that users of communication devices may wish to receive broadcast service transmissions on the communication devices. For example, a user of a mobile communication device may wish to receive a transmission of a sporting event, news channel, movie, or the like that is transmitted to multiple users. These broadcast service transmissions are often encrypted or coded. For example, the broadcast service transmissions may be encrypted to require a user to register for the transmission. Upon registration, the user receives a broadcast subscription key that allows the user to decode the broadcast service transmission.

Unfortunately, there may be a significant delay prior to receiving the broadcast subscription key. For example, a system may desire to authenticate a user, a user's payment method, or the like, prior to sending the user a broadcast subscription key. While the system is performing the authentication, the user is forced to wait to receive the broadcast service transmission.

Furthermore, another problem exists in that a user may wish to preview a broadcast service transmission prior to paying for the transmission. For example, the user may wish to preview the quality of the transmission, the content of the transmission, or the like, prior to paying. Unfortunately, once the user receives the broadcast subscription key, the user can decode the entire broadcast service transmission without paying for it. Thus, current systems do not allow for a user to preview an encrypted broadcast service transmission before the user registers for the transmission.

Thus, there is a need for an improved method and apparatus for broadcast services transmission and reception.

BRIEF DESCRIPTION OF THE DRAWINGS

The embodiments of the present invention will be described with reference to the following figures, wherein like numerals designate like elements, and wherein.

DETAILED DESCRIPTION

Figure 1:
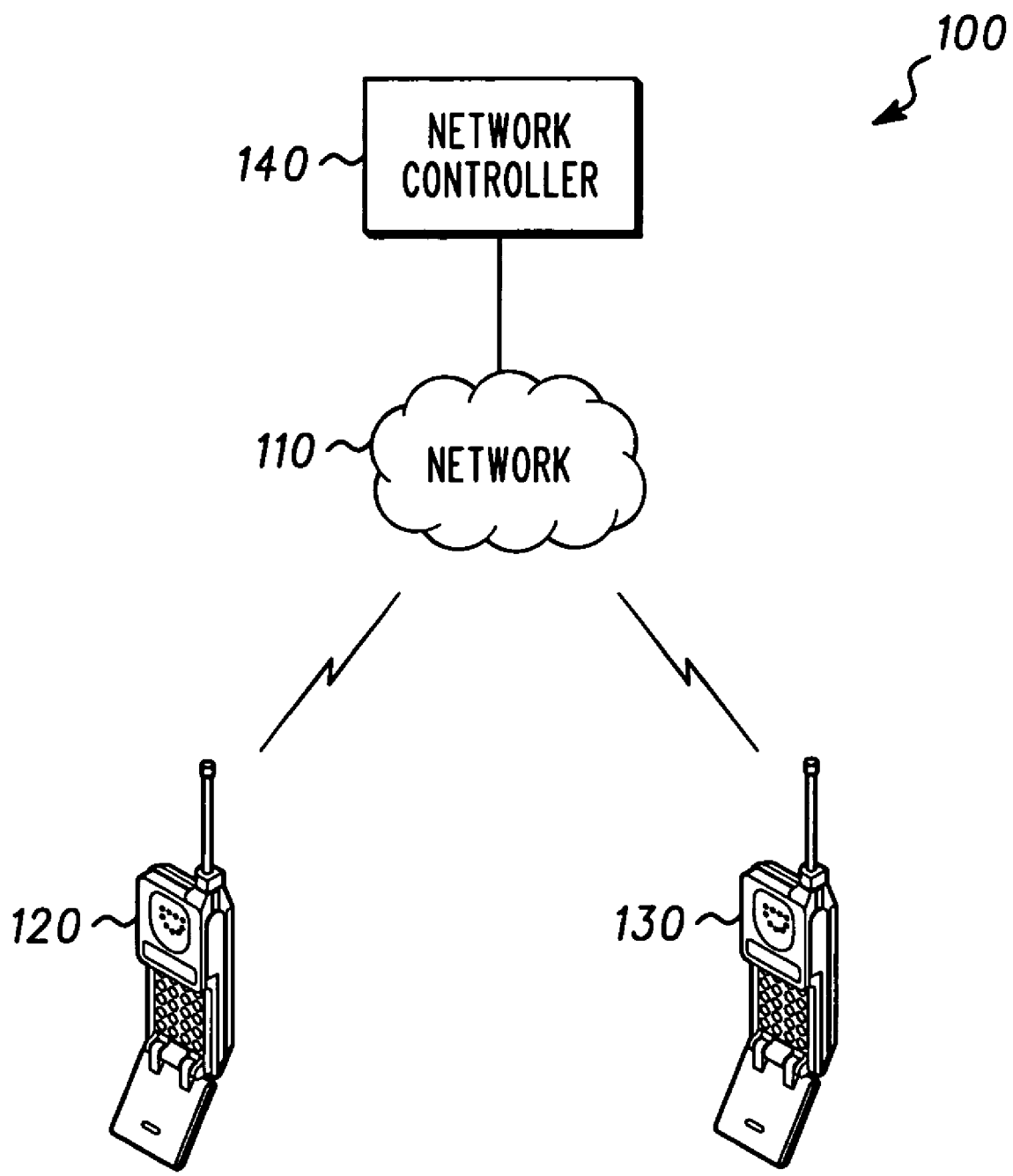
FIG. 1 is an exemplary block diagram of a system according to one embodiment.

The disclosure provides a method and apparatus for encrypted broadcast services transmission and reception. According to one embodiment the method includes requesting a broadcast services transmission, receiving preliminary short time updated key information prior to receiving a broadcast subscription key for the requested broadcast services transmission, receiving an encrypted broadcast services transmission, and decrypting the encrypted broadcast services transmission using the preliminary short time updated key information.

The method can also include receiving the broadcast subscription key, receiving short time updated key information, determining a short time updated key using the broadcast subscription key and the short time updated key information, receiving the encrypted broadcast services transmission, and decrypting the encrypted broadcast services transmission using the short time updated key. These steps may be performed in response to a user agreeing to pay for the broadcast services transmission. These steps may also be performed in response to authorizing a user for reception of the broadcast services transmission.

The preliminary short time updated key information can include an encrypted short time updated key. The method can further include decrypting the encrypted short time updated key using a registration key or any other useful key to obtain a decrypted short time updated key. The step of decrypting the encrypted broadcast services transmission using the preliminary short time updated key information can also include decrypting the encrypted broadcast services transmission using the decrypted short time updated key.

The encrypted short time updated key may be decrypted by some other key that the mobile has, such as an A-key. Therefore, the mobile may not need the broadcast subscription key or a registration key to preview a broadcast transmission, since the registration key may also require authorization or some type of lengthy negotiation if it is not already available in a communication device. In other words, the preliminary short time updated key information could be an A-key encrypted short time updated key rather than a registration key encrypted short time updated key.

The preliminary short time updated key information can be an unencrypted short time updated key. The preliminary short time updated key information can also be an unencrypted preliminary short time updated key. The preliminary short time updated key information can also be an encrypted preliminary short time updated key. Requesting a broadcast services transmission can additionally include requesting a preview broadcast services transmission. The preliminary short time updated key information can include multiple sets of preliminary short time updated key information to allow decryption of the encrypted broadcast services transmission for a predetermined time period.

The preliminary short time updated key information can be original preliminary short time updated key information. The method can then include determining that the original preliminary short time updated key information is at least one of expired and about to expire and requesting additional preliminary short time updated key information to continue decrypting the encrypted broadcast services transmission using the additional preliminary short time updated key information after the original preliminary short time updated key information has expired.

According to another embodiment, the present disclosure provides an apparatus for encrypted broadcast services reception. The apparatus can include a transmitter configured to request a broadcast services transmission, a receiver configured to receive preliminary short time updated key information prior to receiving a broadcast subscription key for the requested broadcast services transmission, the receiver also configured to receive an encrypted broadcast services transmission, a user identification module including a secure user identification module memory unit configured to securely store the broadcast subscription key and a registration key, and a processor configured to decrypt the encrypted broadcast services transmission using the preliminary short time updated key information.

The receiver can be further configured to receive the broadcast subscription key and receive short time updated key information. The user identification module can further include a secure user identification module processing unit configured to determine a short time updated key using the broadcast subscription key and the short time updated key information. The processor can be further configured to decrypt the encrypted broadcast services transmission using the decrypted short time updated key.

The preliminary short time updated key information can include an encrypted short time updated key. The user identification module can further include a secure user identification module processing unit configured to decrypt the encrypted short time updated key using the registration key to obtain a decrypted short time updated key. The processor can be further configured to decrypt the encrypted broadcast services transmission using the preliminary short time updated key information by decrypting the encrypted broadcast services transmission using the decrypted short time updated key decrypted from the preliminary short time updated key information.

The preliminary short time updated key information can include an unencrypted short time updated key. The preliminary short time updated key information can alternately include an unencrypted preliminary short time updated key.

The preliminary short time updated key information can also include multiple sets of preliminary short time updated key information to allow decryption of the encrypted broadcast services transmission for a predetermined time period.

The preliminary short time updated key information can be original preliminary short time updated key information. Then, the processor can be further configured to determine the original preliminary short time updated key information is at least one of expired and about to expire and request additional preliminary short time updated key information to continue decrypting the encrypted broadcast services transmission using the additional preliminary short time updated key information after the original preliminary short time updated key information has expired.

Thus, for example, the present disclosure is directed to broadcast services transmission and reception before authorization. The broadcast service can be provided before the reception of the broadcast service is authorized and/or billed to a user. This service can be provided for a minimum length of time by using expiring keys where at least one key can be provided to a user for immediate decryption of broadcast content before service authentication and/or billing is completed. A second key may also be provided if the first key is due to expire before the minimum length of time. According to one example, the authorization may consist of obtaining a subscription key from a content provider. Therefore, a user can be encouraged to try different broadcast services by enabling a content provider to provide a free sample of a service to establish the quality of content a paid subscriber would receive. The user can also be encouraged to try different broadcast services by reducing the delay to initiate the service by allowing data to be decrypted before the user is authorized and/or has subscribed to the service.

FIG. 1 is an exemplary block diagram of a system 100 according to one embodiment. The system 100 includes a network controller 140, a network 110, and one or more terminals 120 and 130. Terminals 120 and 130 may include communication devices such as telephones, wireless telephones, cellular telephones, PDAs, pagers, personal computers, mobile communication devices, or any other device that is capable of sending and receiving communication signals on a network such as a wireless network.

In an exemplary embodiment, the network controller 140 is connected to the network 110. The controller 140 may be located at a base station, at a radio network controller, or anywhere else on the network 110. The network 110 may include any type of network that is capable of sending and receiving signals, such as wireless signals. For example, the network 110 may include a wireless telecommunications network, a cellular telephone network, a satellite communications network, and other like communications systems capable of sending and receiving communication signals. Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals.

According to one embodiment, the system 100 supports a broadcast service such as a High-Speed Broadcast Service (HSBS), a broadcast/multicast service, or any other broadcast service. An example application for HSBS is video streaming of movies, sports events, etc. The HSBS service can be a packet data service based on the Internet Protocol (IP). According to one exemplary embodiment, a service provider can indicate the availability of such high-speed broadcast service to the users. The users desiring the HSBS service subscribe to receive the service and may discover the broadcast service schedule through advertisements, Short Message Service (SMS), Wireless Application Protocol (WAP), etc. The network controller 140 and base stations (BSs) can transmit HSBS related parameters in overhead messages. When a communication device desires to receive a broadcast service, the communication device can read the overhead messages and learn the appropriate configurations. The communication device can then tune to a frequency containing the HSBS channel, and receive the broadcast service content.

There are several possible subscription/revenue models for HSBS service, including free access, controlled access, and partially controlled access. For free access, no subscription is needed by a communication device to receive the service. A base station may broadcast the content without encryption and interested communication devices can receive the content. The revenue for the service provider can be generated through advertisements that may also be transmitted in the broadcast channel. For example, upcoming movie-clips can be transmitted for which the studios will pay the service provider. The base station may also encrypt the content for free services to require users to register for the free service.

For controlled access, communication device users subscribe to the service and may pay a corresponding fee to receive the broadcast service. Unsubscribed users are not allowed to receive the HSBS service. Controlled access can be achieved by encrypting the HSBS transmission/content so that only the subscribed users can decrypt the content. This may use over-the-air encryption key exchange procedures. This scheme provides strong security and can help prevent theft-of-service.

A hybrid access scheme, referred to as partial controlled access, provides the HSBS service as a subscription-based service that is encrypted with intermittent unencrypted advertisement transmissions. These advertisements may be intended to encourage subscriptions to the encrypted HSBS service. Schedule of these unencrypted segments could be known to the communication device through external means.

For example, video and audio information is provided to the network 110 such as a Packet Data Service Network (PDSN) by the network controller 140, such as a content server. The video and audio information may be from televised programming or a radio transmission. The information can be provided as packetized data, such as in IP packets. The PDSN can process the IP packets for distribution within an Access Network (AN) included in the network 110. An AN can be defined as the portions of the system 100 including a base station on the network 110 in communication with multiple communication devices 120 and 130. For HSBS service, a base station can receive a stream of information transmitted across the network 110 and provide the information on a designated channel to subscribers, such as terminals 120 and 130, within the system 100. To control the access, the content can be encrypted by the network controller 140 before being provided to the network 110. The subscribed users are provided with a decryption key so that the IP packets can be decrypted.

According to one embodiment, the network controller 140 can provide broadcast service by receiving a request for a broadcast services transmission, transmitting preliminary short time updated key information prior to transmitting a broadcast subscription key for the requested broadcast services transmission, and transmitting an encrypted broadcast services transmission. The network controller 140 can also provide broadcast service by authorizing a user to receive the broadcast services transmission, transmitting the broadcast subscription key in response to authorizing the user to receive the broadcast services transmission, and transmitting short time updated key information, the short time updated key information including a broadcast subscription key element and a short time updated key element, where the encrypted broadcast services transmission is encrypted using the short time updated key element. Authorizing the user to receive the broadcast services transmission can include authorizing the user based on the user agreeing to pay for the broadcast services transmission. Authorizing the user to receive the broadcast services transmission can also include authorizing the user based on authorizing the user's payment method for the broadcast services transmission.

The preliminary short time updated key information can include an encrypted short time updated key. The network controller 140 can also provide broadcast service by encrypting the short time updated key using a registration key to obtain the preliminary short time updated key information.

The preliminary short time updated key information can include an unencrypted short time updated key. The preliminary short time updated key information can alternately include an unencrypted preliminary short time updated key. Receiving a request for a broadcast services transmission can also include receiving a request for a preview broadcast services transmission. The preliminary short time updated key information can include multiple sets of preliminary short time updated key information to allow decryption of the encrypted broadcast services transmission for a predetermined time period.

The preliminary short time updated key information can be original preliminary short time updated key information. Then, the network controller 140 can also provide broadcast service by receiving a request for additional preliminary short time updated key information, determining if a preview period is about to expire, and sending additional preliminary short time updated key information if the preview period is not about to expire.

Thus, for example, because there may be a delay in receiving a broadcast subscription key (BAK), latency can be reduced because the registration key (RK) is already present on a terminal 120. This registration key can then be used to decrypt a short time updated key (SK) from preliminary short time updated key information (for example, SK_RANR) for a limited time. This short time updated key can be used to decrypt a broadcast service transmission. For example, the preliminary short time updated key information can expire after a limited time. Typically, by the end of the limited time, a user can either receive a broadcast subscription key to continue decrypting the broadcast service transmission, the user can stop decrypting the broadcast service transmission, or the user can request additional preliminary short time updated key information. Multiple sets of preliminary short time updated key information may be sent to a user to allow the user to continue decrypting the broadcast service transmission for a predetermined time. Also, the provider of the preliminary short time updated key information may detect multiple requests for a "free sample" within a certain time window. The provider may then elect to not provide the preliminary short time updated key information and thus require the user to obtain a broadcast subscription key to continue decryption of the transmission.

Figure 2:
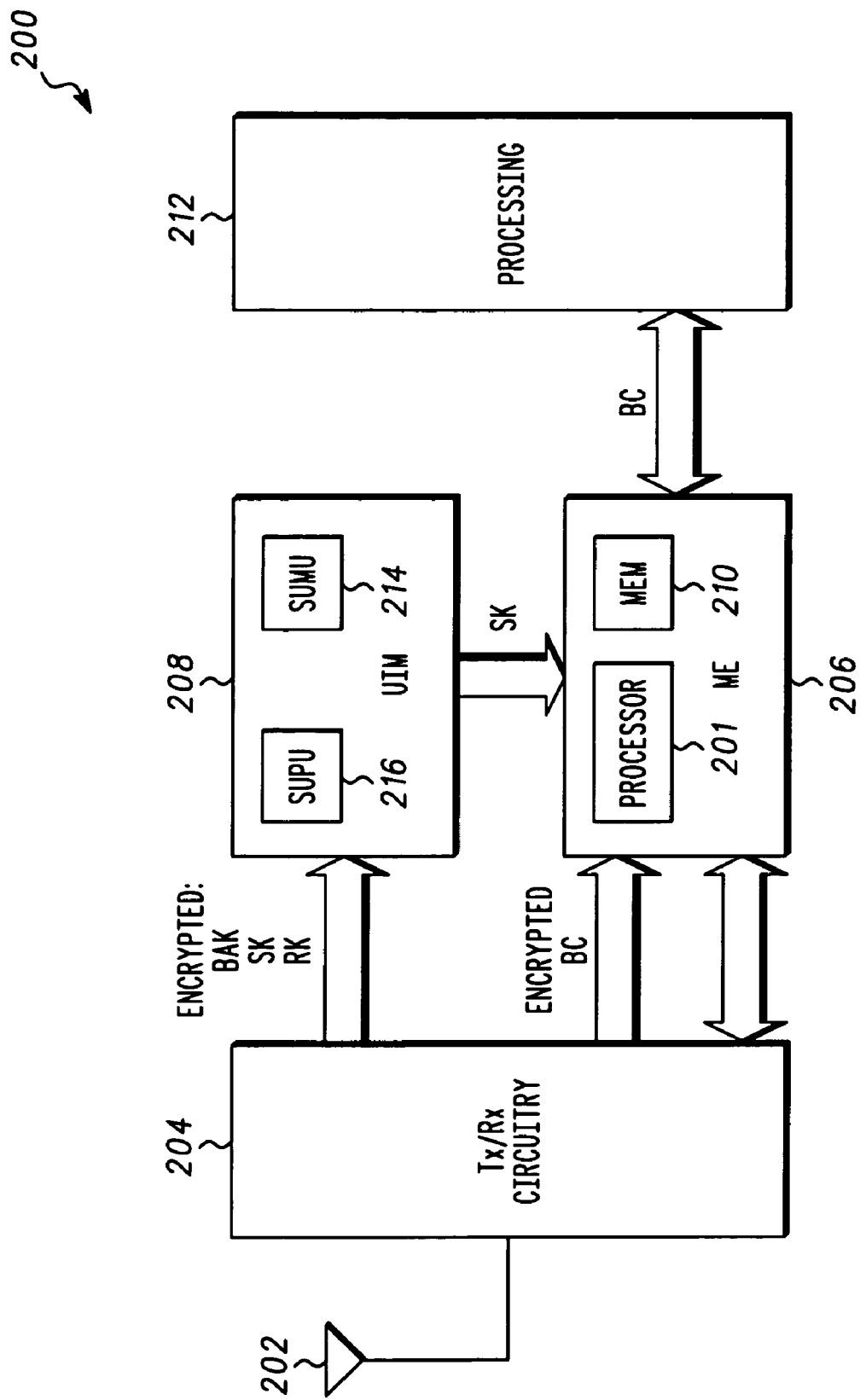
FIG. 2 is an exemplary block diagram of a communication device according to one embodiment.

FIG. 2 is an exemplary block diagram of a communication device 200, such as a terminal 120, according to one embodiment. The communication device 200 can include an antenna 202 coupled to a transceiver 204 such as a transmitter and/or receive circuitry. The communication device 200 can receive transmissions from a base station on the network 110. The communication device 200 can include a User Identification Module (UIM) 208 and Mobile Equipment (ME) 206. The transceiver 204 can be coupled to the UIM 208 and the ME 206. The UIM 208 can apply verification procedures for security of the HSBS transmission and can provide various keys to the ME 206. The ME 206 may be coupled to a processing unit 212. The ME 206 can perform substantial processing, including, but not limited to, decryption of HSBS content streams. The ME 206 can include a memory storage unit, MEM 210 and a processor 201. In an exemplary embodiment data in the processor 201 and the data in the memory storage unit MEM 210 may be accessed easily by a non-subscriber by the use of limited resources, and therefore, the ME 206 is said to be insecure. Thus, any information passed to the ME 206 or processed by the ME 206 remains securely secret for only a short amount of time. It is therefore desired that any secret information, such as key(s), shared with the ME 206 be changed often.

The UIM 208 is trusted to store and process secret information, such as encryption keys, that should remain secret for a long time. As the UIM 208 is a secure unit, the secrets stored therein do not necessarily require the system 100 to change the secret information often. The UIM 208 can include a processing unit referred to as a Secure UIM Processing Unit (SUPU) 216 and memory storage unit referred to as a Secure UIM Memory Unit (SUMU) 214 that is trusted to be secure. Within the UIM 208, the SUMU 214 stores secret information in such a way that as to discourage unauthorized access to the information. For example, a significantly large amount of resources may be required to attempt to obtain the secret information from the UIM 208. Also within the UIM 208, the SUPU 216 can perform computations on values that may be external to the UIM 208 and/or internal to the UIM 208. The results of the computation may be stored in the SUMU 214 or passed to the ME 206. The computations performed with the SUPU 216 may also be difficult to obtain by unauthorized entities. For example, computations performed can only possibly be obtained from the UIM 208 by an entity with significantly large amount of resources. Similarly, outputs from the SUPU 216 that are designated to be stored within the SUMU 214 (but not output to the ME 206) are designed such that unauthorized interception is difficult because it requires significantly large amount of resources. In addition to the secure memory and processing within the UIM 208, the UIM 208 may also include non-secure memory and processing for storing information including telephone numbers, e-mail address information, web page or URL address information, scheduling functions, or the like.

In one embodiment, the UIM 208 is a stationary unit within the communication device 200. In another embodiment, the UIM is a unit removable from the communication device 200. In the exemplary embodiment, the SUPU 216 does not have significant processing power for functions beyond security and key procedures, such as to allow decryption of the broadcast content of the HSBS. Alternate embodiments may implement a UIM having stronger processing power.

The UIM 208 can be associated with a particular user and can be used primarily to verify that the communication device 200 is entitled to the privileges afforded the user, such as access to the network 110. Therefore, a user may be associated with the UIM 208 rather than with an communication device 200. Also, the same user may be associated with multiple UIMs.

A broadcast service typically faces a problem in determining how to distribute keys to subscribed users. To decrypt broadcast content at a particular time, the ME 206 must know the current decryption key. To avoid theft-of-service, the decryption key can be changed frequently, for example, every minute. These decryption keys are called short time updated keys such as Short-term Keys (SK). The SK is used to decrypt the broadcast content for a short-amount of time. Thus, the SK can be assumed to have some amount of intrinsic monetary value for a user. For example, this intrinsic monetary value may be a portion of the registration costs. Accordingly, a SK is typically determined so that the cost of a non-subscriber obtaining the SK from the memory storage unit, MEM 210, of a subscriber exceeds the intrinsic monetary value of SK. That is, the cost of illegitimately obtaining the SK exceeds the reward, so there is no benefit to illegitimately obtaining the SK. Consequently, there is no need to protect SK in the memory storage unit, MEM 210. However, if a secret key has a lifetime longer than that of an SK, then the cost of illegitimately obtaining this secret key is less than the reward. In this situation, there is a benefit in obtaining such a key from the memory storage unit, MEM 210. Therefore, ideally the memory storage unit, MEM 210 will not store secrets or keys with a lifetime longer than that of an SK.

The channels used by the network controller 140 such as a content server to distribute the SK to the various subscriber units are considered insecure. Therefore, when distributing a given SK, the content server desires to use a technique that hides the value of the SK from non-subscribed users. Furthermore, the content server distributes the SK to each of a potentially large number of subscribers for processing in respective communication devices within a relatively short timeframe. Known secure methods of key transmission are slow and require transmission of a large number of keys, and are generally not feasible for the desired criteria. One exemplary embodiment is a feasible method of distributing decryption keys to a large set of subscribers within a small time-frame in such a way that non-subscribers cannot obtain the decryption keys.

In one exemplary embodiment, the communication device 200 supports HSBS in a wireless communication system. To obtain access to HSBS, the user must register and then subscribe to the service. Once the subscription is enabled, the various keys are updated periodically. In the registration process the content server and the UIM 208 agree on a Registration Key (RK) that serves as a security association between the user and the content server. The content server may then send the UIM 208 further secret information encrypted with the RK. The RK is kept as a secret in the UIM 208 such as in the SUMU 214, and is unique to a given UIM. Accordingly, each user is assigned a different RK. The registration process alone does not necessarily give the user access to HSBS. As stated above, after registration, the user can then subscribe to the service. In the subscription process the content server sends the UIM 208 the value of a common broadcast subscription key such as a Broadcast Access Key (BAK). The content server sends the communication device 200, and specifically UIM 208, the value of BAK encrypted using the RK unique to the UIM 208. The UIM 208 is then able to recover the value of the original BAK from the encrypted version by using the RK. The BAK serves as a security association between the content server and the group of subscribed users. The content server then broadcasts data called SK Information (SKI) that is combined with the BAK in the UIM 208 to derive SK. The UIM 208 then passes SK to the ME 206. In this way, the content server can efficiently distribute new values of SK to the ME of subscribed users.

According to a more detailed embodiment, when a user registers with a given content server, the UIM 208 and the content server can set-up a security association. For example, the UIM 208 and the content server can agree on a secret key RK. The RK can be unique to each UIM 208, although if a user has multiple UIMs then these UIMs may share the same RK dependent on the policies of the content server. The registration may occur when the user subscribes to a broadcast channel offered by the content server or may occur prior to subscription. A single content server may offer multiple broadcast channels. The content server may choose to associate the user with the same RK for all channels or require the user to register for each channel and associate the same user with different RKs on different channels. Additionally, multiple content servers may choose to use the same registration keys or require the user to register and obtain a different RK for each content server.

Two common scenarios for setting up this security association include the Authenticated Key Agreement (AKA) method as used in 3GPP and the Internet Key Exchange (IKE) method as used in IPSec. The UIM memory unit SUMU 214 can contain a secret key, such as an A-key, according to the AKA. As an example, the AKA method is described. In the AKA method the A-key is a secret known only to the UIM and a trusted third party (TTP). The TTP may consist of more than one entity. The TTP is typically the mobile service provider with whom the user is registered. All communication between the content server and TTP can be secure and the content server can trust that the TTP will not assist unauthorized access to the broadcast service. When the user registers, the content server can inform the TTP that the user wishes to register for the service and can provide verification of the user's request. The TTP can use a function similar to a cryptographic hash function to compute the RK from the A-key and additional data called Registration Key Information (RKI). The TTP can pass the RK and/or RKI to the content server over a secure channel along with other data not relevant to the submission. The content server can then send RKI to the communication device 200. The transceiver 204 can pass RKI to the UIM 208 and possibly pass the RKI to the ME 206. The UIM 208 can then compute the RK from the RKI and the A-key that is stored in the UIM memory unit SUMU 214. The RK is then stored in the UIM memory unit SUMU 214 and is typically not provided directly to the ME 206. Alternate embodiments may use an IKE scenario or some other method to establish the RK. The RK can serve as the security association between the content server and UIM 208.

In the AKA method, the RK is a secret shared between the content server, the UIM, and the TTP. Therefore, the AKA method can imply that any security association between the content server and UIM can implicitly include the TTP. The inclusion of the TTP in any security association is not considered a breach of security, as the content server trusts the TTP not to assist in unauthorized access to the broadcast channel. As mentioned, if a key is shared with the ME 206, it is desirable to change that key often. This is due to the risk of a non-subscriber accessing information stored in the memory storage unit, MEM 210, and thus allowing access to a controlled or partially controlled service. The ME 206 can store such a key, the SK, the key information used for decrypting broadcast content, in the memory storage unit, MEM 210. The content server must send sufficient information for subscribed users to compute the SK. If the ME 206 of a subscribed user could compute SK from this information, then additional information required to compute SK cannot be secret. In this case, the ME 206 of a non-subscribed user could also compute the SK from this information. Hence, the value of SK must be computed in the SUPU 216, using a secret key shared by the content server and SUMU 214. The RK could be used to securely generate the SK because the content server and SUMU 214 share the value of RK. However, each user has a unique value of RK. Thus, there can be insufficient time for the content server to encrypt SK with every value of RK for an entire broadcast services transmission and transmit these encrypted values to each subscribed user. Therefore, another technique can be used.

According to this other technique, for subscription, to ensure the efficient distribution of the security information SK, the content server periodically distributes a common Broadcast Access Key (BAK) to each subscriber UIM 208. For each subscriber, the content server encrypts BAK using the corresponding RK to obtain a value called BAKI (BAK Information). The content server can then transmit the corresponding BAKI to a communication device 200 of each subscribed user. For example, BAK may be transmitted as an IP packet encrypted using the RK corresponding to each communication device. In an exemplary embodiment, BAKI is an IPSec packet containing BAK that is encrypted using RK as the key. Since RK is a per-user key, the content server must send the BAK to each subscriber individually. Thus, the BAK is not sent over the broadcast channel. When the BAKI is received, the communication device 200 passes the BAKI to the UIM 208. The SUPU 216 then computes BAK using the value of RK stored in the SUMU 214 and the value of BAKI. The value of BAK is then stored in the SUMU 214. In an exemplary embodiment, the BAKI contains a Security Parameter Index (SPI) value instructing the communication device 200 to pass BAKI to the UIM 208, and instructing the UIM 208 to use the RK for decrypting the BAKI.

The period for updating the BAK is desired to be sufficient to allow the content server to send the BAK to each subscriber individually, without incurring significant overhead. Since the ME 206 is not trusted to keep secrets for a long time, the UIM 208 does not provide the BAK to the ME 206. The BAK serves as the security association between the content server and the group of subscribers of HSBS service.

The following paragraph discusses how the SK is updated following a successful subscription process. Within each period for updating the BAK, a short-term interval is provided during which SK is distributed on a broadcast channel. The content server uses a cryptographic function to determine two values SK and SKI (SK Information) such that the SK can be determined from the BAK and the SKI. For example, the SKI may be the encryption of the SK using the BAK as the key. In an exemplary embodiment, the SKI is an IPSec packet containing the SK that is encrypted using the BAK as the key. Alternatively, the SK may be the result of applying a cryptographic hash function to the concatenation of the blocks SKI and BAK.

Some portion of SKI may be predictable. For example, a portion of SKI may be derived from the system time during which this SKI is valid. This portion, denoted SKI_A, need not be transmitted to the communication device 200 as part of the broadcast service. The remainder of SKI, denoted SKI_B, may be unpredictable. The SKI_B can be transmitted to the communication device 200 as part of the broadcast service. The communication device 200 can reconstruct the SKI from SKI_A and SKI_B and can provide the SKI to the UIM 208. For example, the SKI may be reconstructed within the UIM 208. The value of SKI typically changes for each new SK. Thus, either SKI_A and/or SKI_B must change when computing a new SK. The content server sends SKI_B to a base station for broadcast transmission. The base station then can broadcast SKI_B, which is detected by the antenna 202 and passed to the transceiver 204. The transceiver 204 then provides SKI_B to the communication device 200, wherein the communication device 200 reconstructs SKI. For example, the communication device 200 can provide SKI to the UIM 208, wherein the UIM 208 obtains the SK using the BAK stored in the SUMU 214. The SK is then provided by the UIM 208 to ME 206. The ME 206 stores the SK in the memory storage unit, MEM 210. The ME 206 then uses the SK to decrypt broadcast transmissions received from the content server.

In an exemplary embodiment, the SKI also contains a Security Parameter Index (SPI) value instructing the communication device 200 to pass the SKI to the UIM 208, and instructing the UIM 208 to use the BAK for decrypting the SKI. After decryption, the UIM 208 passes the SK to the ME 206, wherein ME 206 uses the SK to decrypt broadcast content.

The content server and base station can agree on some criteria for when SKI_B is to be transmitted. The content server may desire to reduce the intrinsic monetary value in each SK by changing SK frequently. In this situation, the desire to change SKI_B data is balanced against optimizing available bandwidth. The SKI_B may be transmitted on a channel other than the broadcast channel. When a user "tunes" to the broadcast channel, the transceiver 204 obtains information for locating the broadcast channel from a control channel. It may be desirable to allow quick access when a user "tunes" to the broadcast channel. This requires the ME 206 to obtain SKI within a short amount of time. The ME 206 will already know SKI_A, however, the base station must provide SKI_B to ME 200 within this short amount of time. For example, the base station may frequently transmit SKI_B on the control channel along with the information for locating the broadcast channel, or frequently transmit SKI_B on the broadcast channel. The more often that the base station "refreshes" the value of SKI_B, the faster the communication device 200 can access the broadcast message. The desire to refresh SKI_B data is balanced against optimizing available bandwidth, as transmitting SKI_B data too frequently may use an unacceptable amount of bandwidth in the control channel or broadcast channel.

According to one embodiment for the encryption and transmission of the broadcast content, the content server encrypts the broadcast content using the current SK. An encryption algorithm can be employed, such as the Advanced Encryption Standard (AES) Cipher Algorithm. The encrypted content can then be transported by an IPsec packet according to the Encapsulating Security Payload (ESP) transport mode. The IPsec packet also contains an SPI value that instructs the ME 206 to use the current SK to decrypt received broadcast content. The encrypted content can then be sent via the broadcast channel.

The transceiver 204 can provide the RKI and the BAKI directly to the UIM 208. Further, the transceiver 204 can provide the SKI_B to an appropriate part of the communication device 200 where it is combined with the SKI_A to obtain the SKI. The SKI can then be provided to the UIM 208 by the relevant part of the communication device 200. The UIM 208 can compute the RK from the RKI and A-key, decrypt the BAKI using the RK to obtain BAK, and compute the SK using the SKI and the BAK to generate an SK for use by the ME 206. The ME 206 can then decrypt the broadcast content using the SK. The UIM 208 of an exemplary embodiment may not be sufficiently powerful for decryption of broadcast content in real time and therefore, the SK can be passed to the ME 206 for decrypting the broadcast content.

According to another embodiment, a RK encrypted SK can be sent to the communication device 200. For example, SK information can be encrypted using the RK to obtain SKIR. This can be useful to allow a user to view and/or listen to a transmission without using the BAK. For example, the SKIR may be transmitted for a limited time or a limited number of SKIR's may be sent to allow a user to preview a transmission for a limited time before registering to receive the BAK. This can also allow a user to view a transmission while the content server authenticates the user or the user's payment prior to sending the BAK. While the SKIR may not be as secure as the BAK-encrypted SKI, the limited life of the SKIR mitigates unauthorized reception of the transmission.

Figure 3:
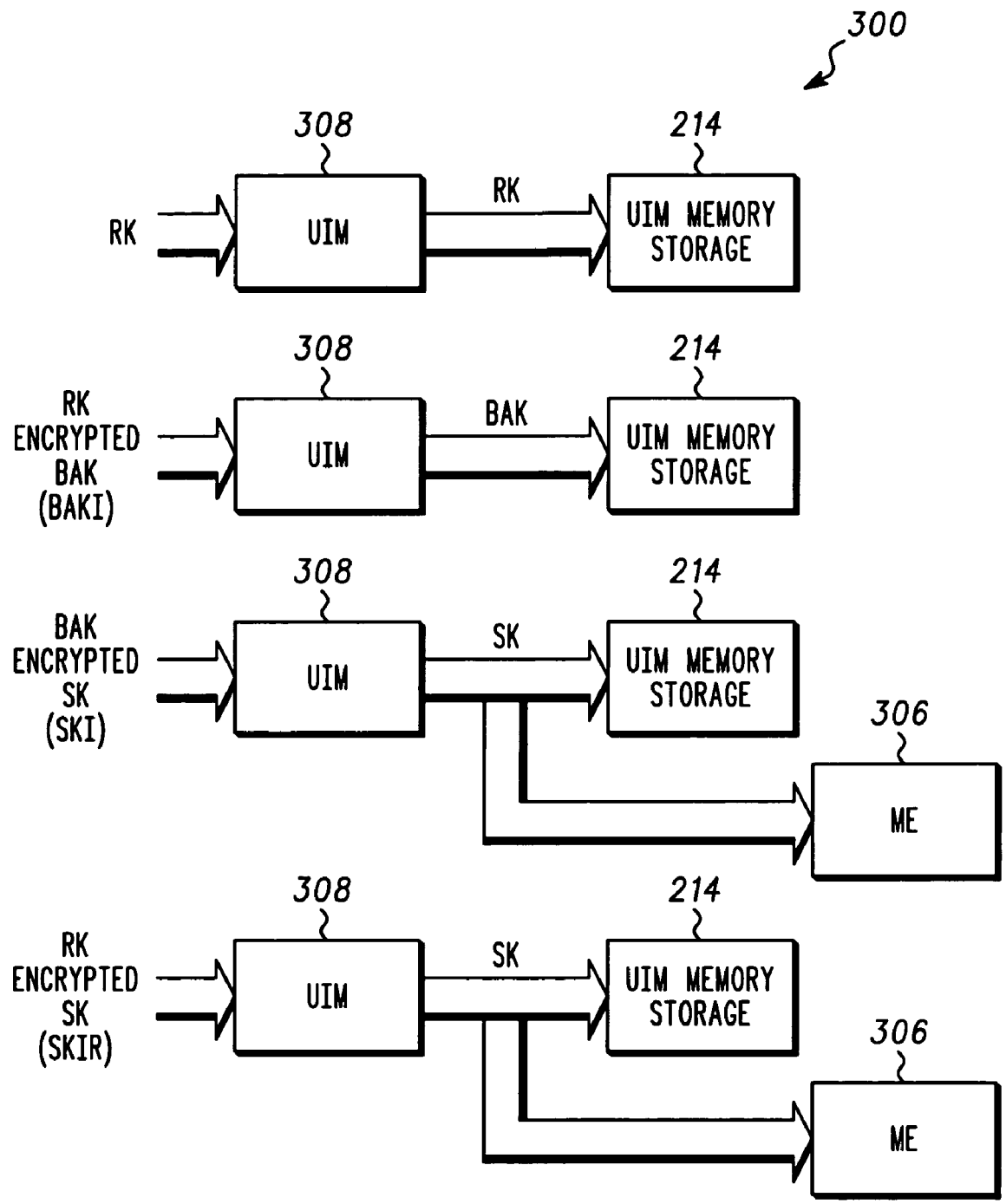
FIG. 3 is an exemplary illustration of the transmission and processing of keys RK, BAK, a BAK encrypted SK, and a RK encrypted SK according to one embodiment.

FIG. 3 is an exemplary illustration 300 of the transmission and processing of keys RK, RK encrypted BAK, BAK encrypted SK, and an RK encrypted SK according to an exemplary embodiment. As illustrated, at registration the communication device 200 can receive the RK in the RKI and can pass it to UIM 208, wherein the SUPU 216 computes RK using RKI and the A-key, and stores the RK in UIM memory storage SUMU 214. The communication device 200 periodically receives the BAKI that contains BAK encrypted using the RK value specific to UIM 208. The encrypted BAKI is decrypted by SUPU 216 to recover the BAK, which is stored in UIM memory storage SUMU 214. The communication device 200 further periodically receives an SKI_B that it combines with SKI_A to form SKI. The SUPU 216 computes SK from SKI and BAK. The SK is provided to ME 206 for decrypting broadcast content. Also, when it is desired to let a user view a transmission without using the BAK, the communication device 200 can periodically receive a RK encrypted SK (SKIR). The SUPU 216 computes SK from the SKIR and the RK. The SK is provided to ME 206 for decrypting broadcast content.

Figure 4:
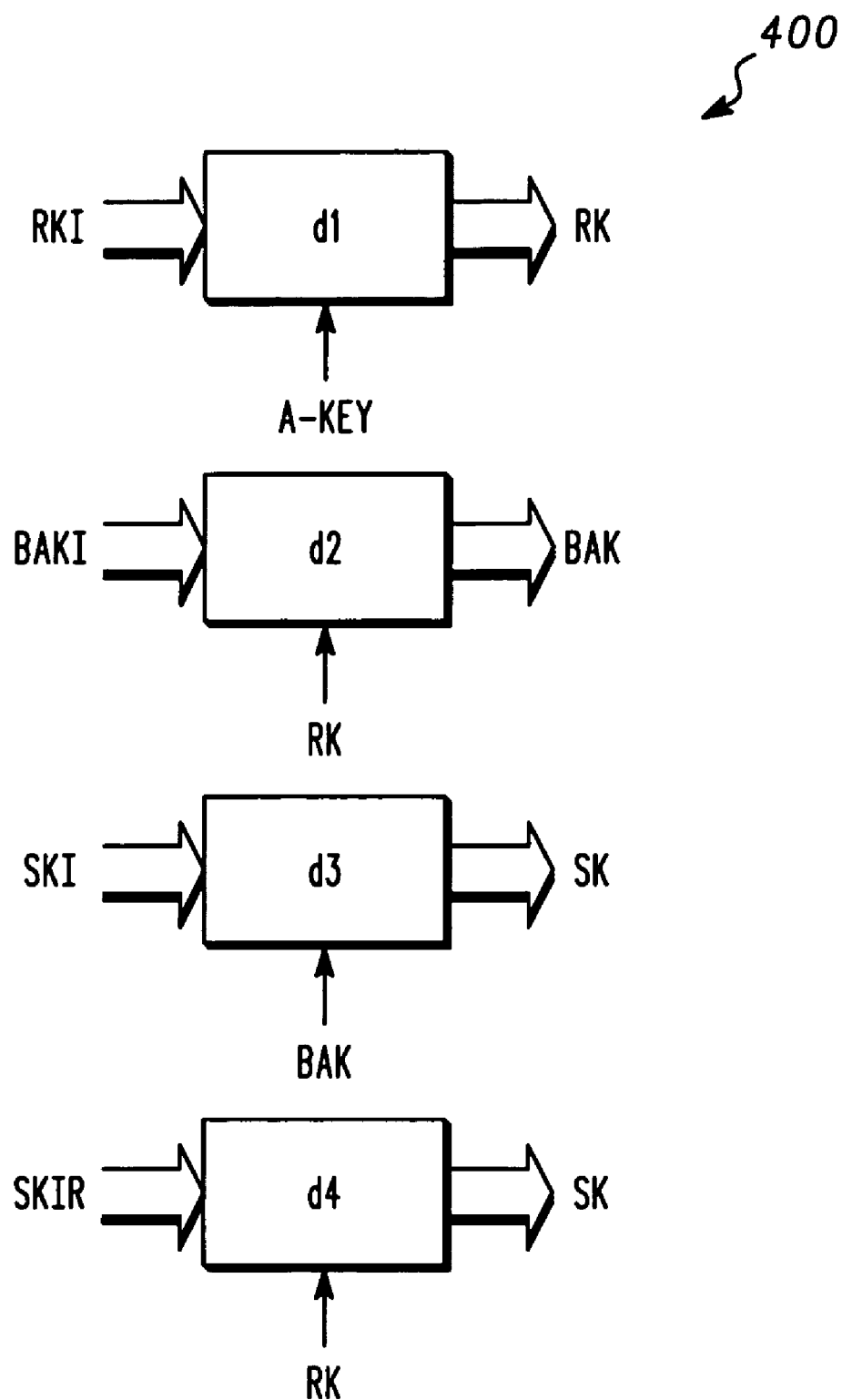
FIG. 4 is an exemplary illustration of the generation of various keys according to one embodiment.

FIG. 4 is an exemplary illustration 400 of the generation of various keys according to one embodiment. As illustrated, the RK is generated by the content server, but RK Information (RKI) is transmitted to the communication device 200. The content server sends information sufficient for the UIM to derive the RK, wherein a predetermined function is used to derive the RK from transmitted information from the content server. The RKI contains sufficient information for the communication device 200 to determine the original RK from the A-key and other values, such as system time, using a predetermined public function labeled d1, wherein:

$$RK = d1(A\text{-key}, RKI) \tag{1}$$

In an exemplary embodiment, the function d1 defines a cryptographic-type function. According to one embodiment, RK is determined as:

$$RK = SHA'(A\text{-key.parallel.}RKI) \tag{2}$$

where ".parallel." denotes the concatenation of the blocks containing A-key and RKI, and SHA'(X) denotes the last 128-bits of output of the Secure Hash Algorithm SHA-1 given the input X. In an alternative embodiment, RK is determined as:

$$RK = AES(A\text{-key}, RKI) \tag{3}$$

where AES(X,Y) denotes the encryption of the 128-bit block RKI using the 128-bit A-key. In a further embodiment based on the AKA protocol, RK is determined as the output of the 3GPP key generation function f3, wherein RKI includes the value of RAND and appropriate values of AMF and SQN as defined by the standard.

The BAK can be treated in a different manner because multiple users having different values of RK must compute the same value of BAK. The content server may use any technique to determine BAK. However, the value of BAKI associated with a particular UIM 208 can be the encryption of BAK under the unique RK associated with that UIM 208. The SUPU 216 decrypts BAKI using RK stored in the SUMU 214 according to the function labeled d2, according to:

$$BAK = d2(BAKI, RK) \quad (4)$$

In an alternate embodiment, the content server may compute BAKI by applying a decryption process to BAK using RK, and the SUPU 216 obtains BAK by applying the encryption process to BAKI using RK. This is considered equivalent to the content server encrypting BAK and the SUPU 216 decrypting BAKI. Alternate embodiments may implement any number of key combinations in addition to or in place of those illustrated in FIG. 4.

The SK can be treated in a similar manner to RK. First SKI is derived from the SKI_A and SKI_B (SKI_B is the information transmitted from content server to MS). Then a predetermined function labeled d3 is used to derive the SK from SKI and BAK (stored in the SUMU 214), according to:

$$SK = d3(BAK, SKI) \quad (5)$$

In one embodiment, the function d3 defines a cryptographic-type function. In an exemplary embodiment, SK is computed as:

$$SK = SHA(BAK.parallel.SKI) \quad (6)$$

while in another embodiment, SK is computed as $$SK = AES(BAK, SKI) \quad (7)$$

The SKIR can be treated in a similar manner to the SKI. For example, a predetermined function labeled d4 can be used to derive the SK from SKIR and RK (stored in the SUMU 214), according to:

$$SK = d4(RK, SKIR) \quad (8)$$

In one embodiment, the function d4 defines a cryptographic-type function. In an exemplary embodiment, SK is computed as:

$$SK = SHA(RK.parallel.SKIR) \quad (9)$$

while in another embodiment, SK is computed as $$SK = AES(RK, SKIR) \quad (10)$$

FIGS. 5–8 are exemplary flowcharts 500, 600, 700, and 800 outlining the operation of providing the security for a broadcast message according to one embodiment.

Figure 5:
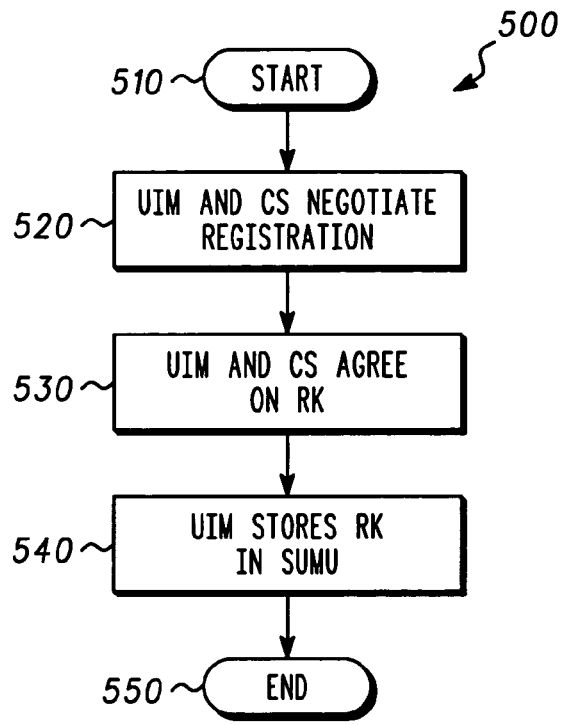
FIG. 5 is an exemplary flowchart illustrating a registration process according to one embodiment.

FIG. 5 is an exemplary flowchart illustrating a registration process 500 according to one embodiment. In step 510, the flowchart 500 begins. In step 520, a subscriber negotiates registration with the content server. The registration in step 530 provides the UIM a unique RK. The UIM stores the RK in a Secure Memory Unit (SUMU) in step 540. In step 550, the flowchart ends.

Figure 6:
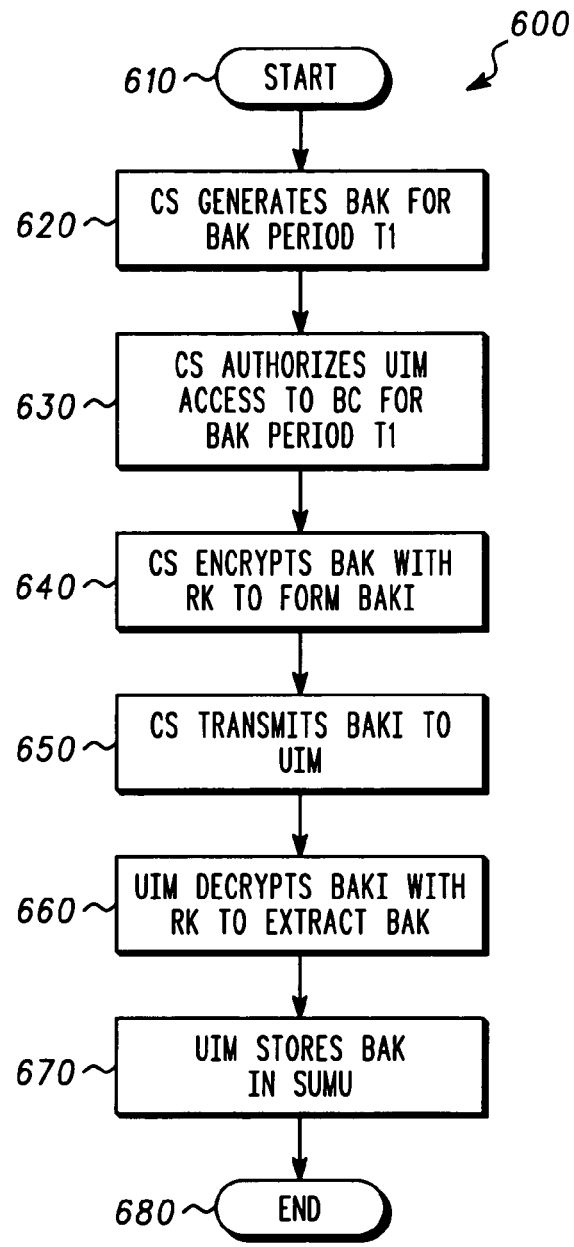
FIG. 6 is an exemplary flowchart outlining subscription processing between a content server and a communication device according to one embodiment.

FIG. 6 is an exemplary flowchart 600 outlining the subscription processing between a content server and a communication device. In step 610, the flowchart 600 begins. In step 620, the content server generates a BAK for a BAK time period T1. The BAK is valid throughout the BAK time period T1, wherein the BAK is periodically updated. In step 630 the content server authorizes the UIM 208 to have access to the Broadcast Content (BC) during the BAK timer period T1. In step 640, the content server encrypts the BAK using each individual RK for each subscriber. The encrypted BAK is referred to as the BAKI. The content server then transmits the BAKI to the UIM 208 in step 650. The UIM receives the BAKI and performs decryption using the RK in step 660. The decrypted BAKI results in the originally generated BAK. The UIM stores the BAK n a SUMU in step 670. The UIM then receives the broadcast session and is able to access the broadcast content (BC) in the broadcast services transmission by applying the BAK to decryption of the encrypted broadcast (EBC). In step 680, the flowchart ends.

Figure 7:
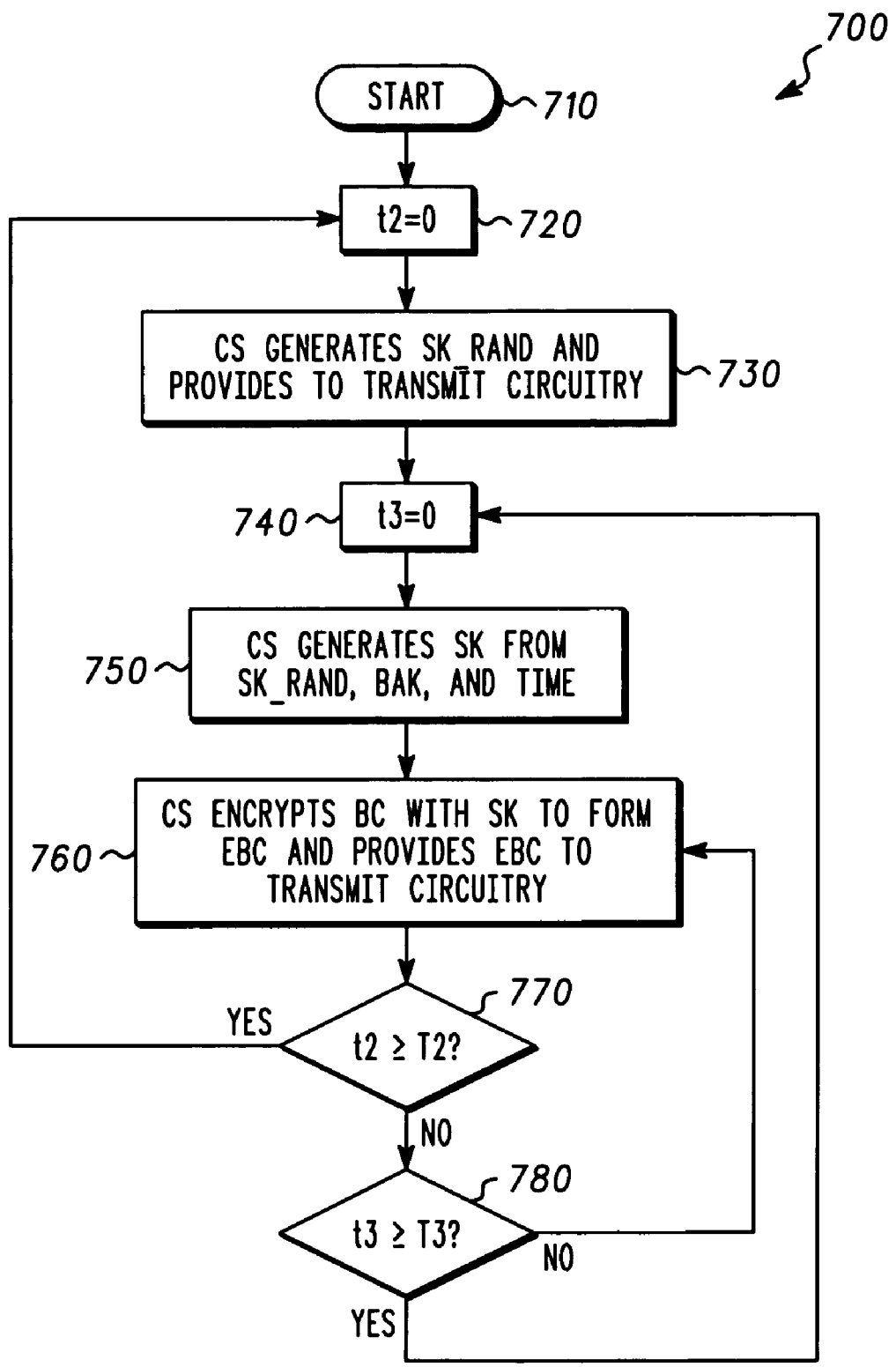
FIG. 7 is an exemplary flowchart outlining a method of updating keys for security encryption in a wireless communication system supporting broadcast service according to one embodiment.
Figure 9:
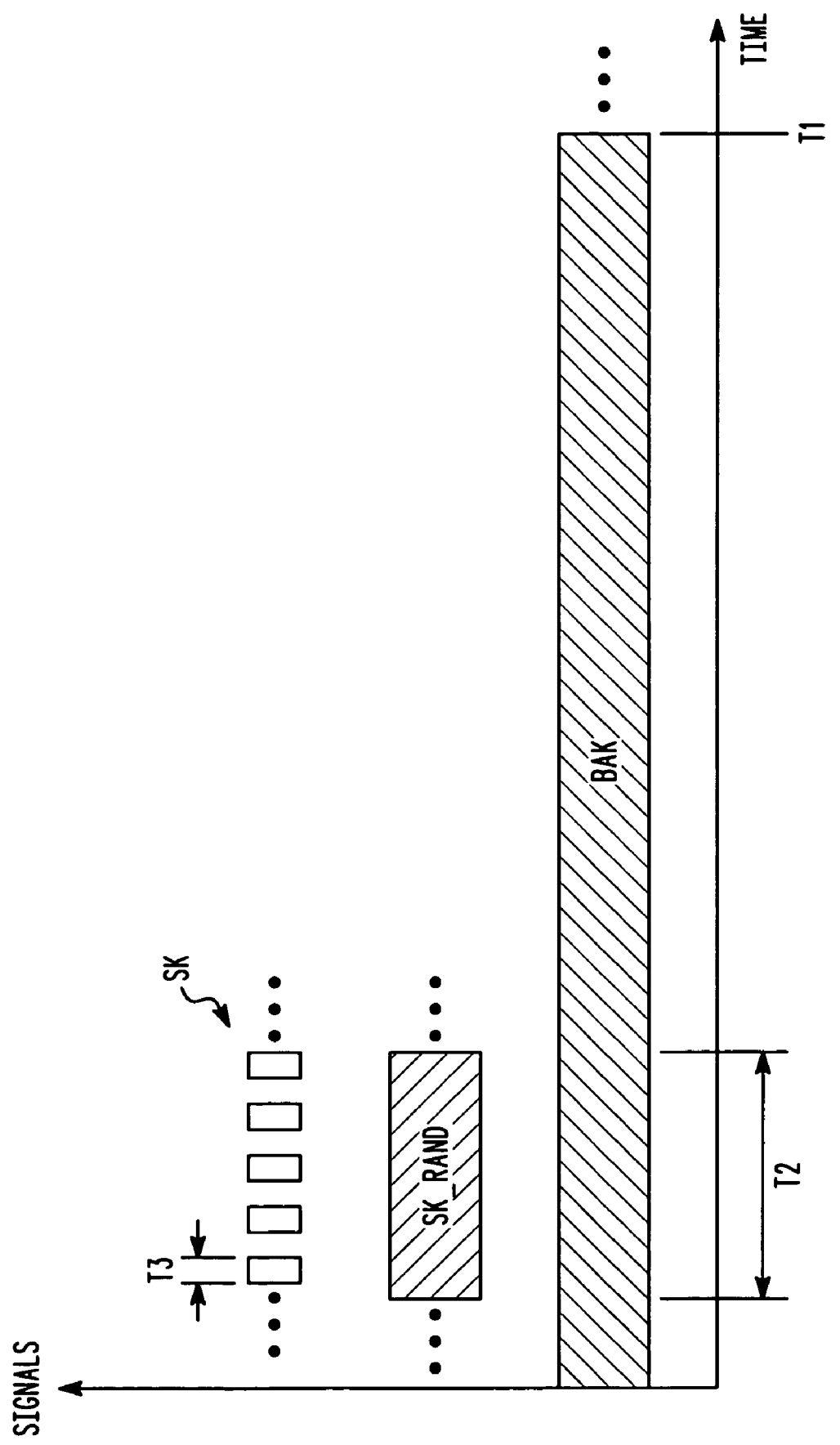
FIG. 9 is an exemplary illustration of time periods for the operation of the disclosed system according to one embodiment.

FIG. 7 is an exemplary flowchart 700 outlining a method of updating keys for security encryption in a wireless communication system 100 supporting broadcast service according to one embodiment. This method implements time periods as given in FIG. 9. For example, the BAK is updated periodically having a time period T1. A timer t1 is initiated when the BAK is calculated and times out at T1. A variable is used for calculating the SK referred to as SK_RAND, which is updated periodically having a time period T2. A timer t2 is initiated when the SK_RAND is generated and times out at T2. In one embodiment, the SK is further updated periodically having a period of T3. A timer t3 is initiated when each SK is generated and time out at time T3. The SK_RAND is generated at the content server and provided periodically to the communication device 200. The communication device 200 and the content server use SK_RAND to generate the SK, as detailed below.

A first timer t1 is reset when the applicable value of BAK is updated. The length of time between two BAK updates is the BAK update period. In the exemplary embodiment the BAK update period is a month, however, alternate embodiments may implement any time period desired for optimum operation of the system, or to satisfy a variety of system criteria.

Continuing with the flowchart 700, in step 710, the flowchart 700 begins. The timer t2 is initialized in step 720 to start the SK_RAND time period T2. The content server generates SK_RAND and provides the value to transmit circuitry for transmission throughout the system at step 730. The timer t3 is initialized in step 740 to start the SK time period T3. The content server then generates the SK from SK_RAND, BAK and time in step 750. The content server then encrypts the BC using the current SK in step 760. The encrypted product is the EBC, wherein the content server provides the EBC to transmit circuitry for transmission in the system 100. If the timer t2 has expired at decision diamond 770, processing returns to step 720. While t2 is less than T2, if the timer t3 has expired at decision diamond 780, processing returns to step 740; else processing returns to 760.

Figure 8:
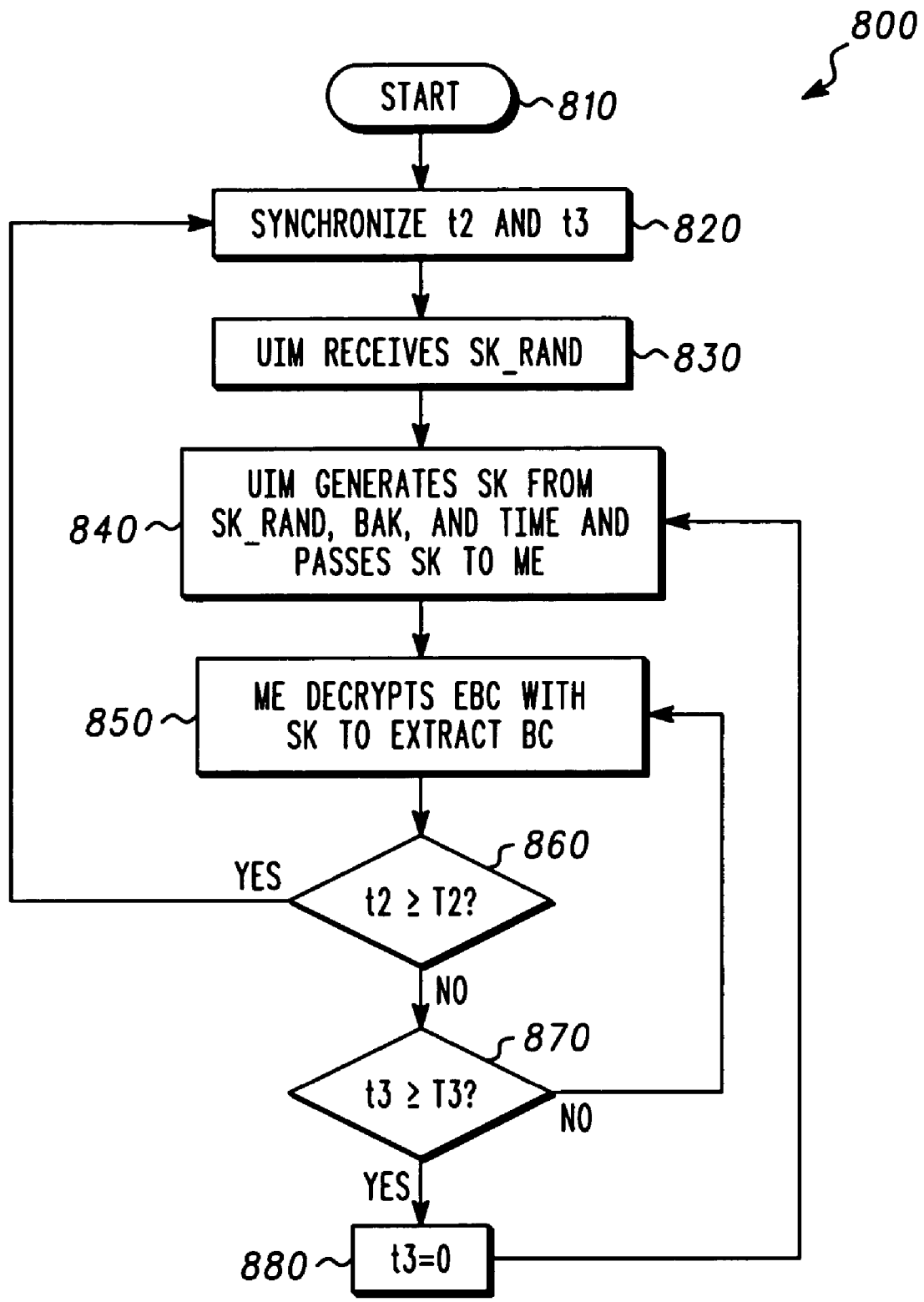
FIG. 8 is an exemplary flowchart outlining the operation of the communication device when accessing a broadcast service according to one embodiment.

FIG. 8 is an exemplary flowchart 800 outlining the operation of the communication device 200 when accessing a broadcast service according to one embodiment. In step 810, the flowchart 800 begins. In step 820, the timers t2 and t3 are synchronized with the values at the content server. The UIM 208 of the communication device 200 receives the SK_RAND generated by the content server in step 830. In step 840, the UIM 208 generates the SK using the SK_RAND, BAK, and a time measurement and passes the SK to the ME 206 of the communication device 200. The ME 206 then decrypts the received encrypted broadcast content (EBC) using the SK to extract the original broadcast content (BC) in step 850. When the timer t2 expires in step 860, processing returns to step 820. While the timer t2 is less than T2, if the timer t3 expires at step 870, the timer t3 is initialized at step 880 and returns to 840, otherwise, the flowchart 800 returns to step 850.

When the user subscribes to the broadcast service for a particular BAK update period, the content server sends the appropriate information BAKI corresponding to the BAK encrypted with the RK. This typically occurs prior to the beginning of this BAK update period or when the communication device 200 first tunes to the broadcast channel during this BAK update period. This may be initiated by the communication device 200 or content server according to a variety of criteria. Also, multiple BAKI may be transmitted and decrypted simultaneously.

When expiration of the BAK update period is imminent, the communication device 200 may request the updated BAK from the content server if the communication device 200 has subscribed for the next BAK update period. In an alternate embodiment the first timer t1 is used by the content server, where upon expiration of the timer, i.e., satisfaction of the BAK update period, the content server transmits another BAK.

It is possible for a user to receive a BAK during a BAK update period. For example, a subscriber joins the service mid-month when the BAK updates are performed monthly. Additionally, the time periods for BAK and SK updates may be synchronized, such that all subscribers are updated at a given time.

Figure 10:
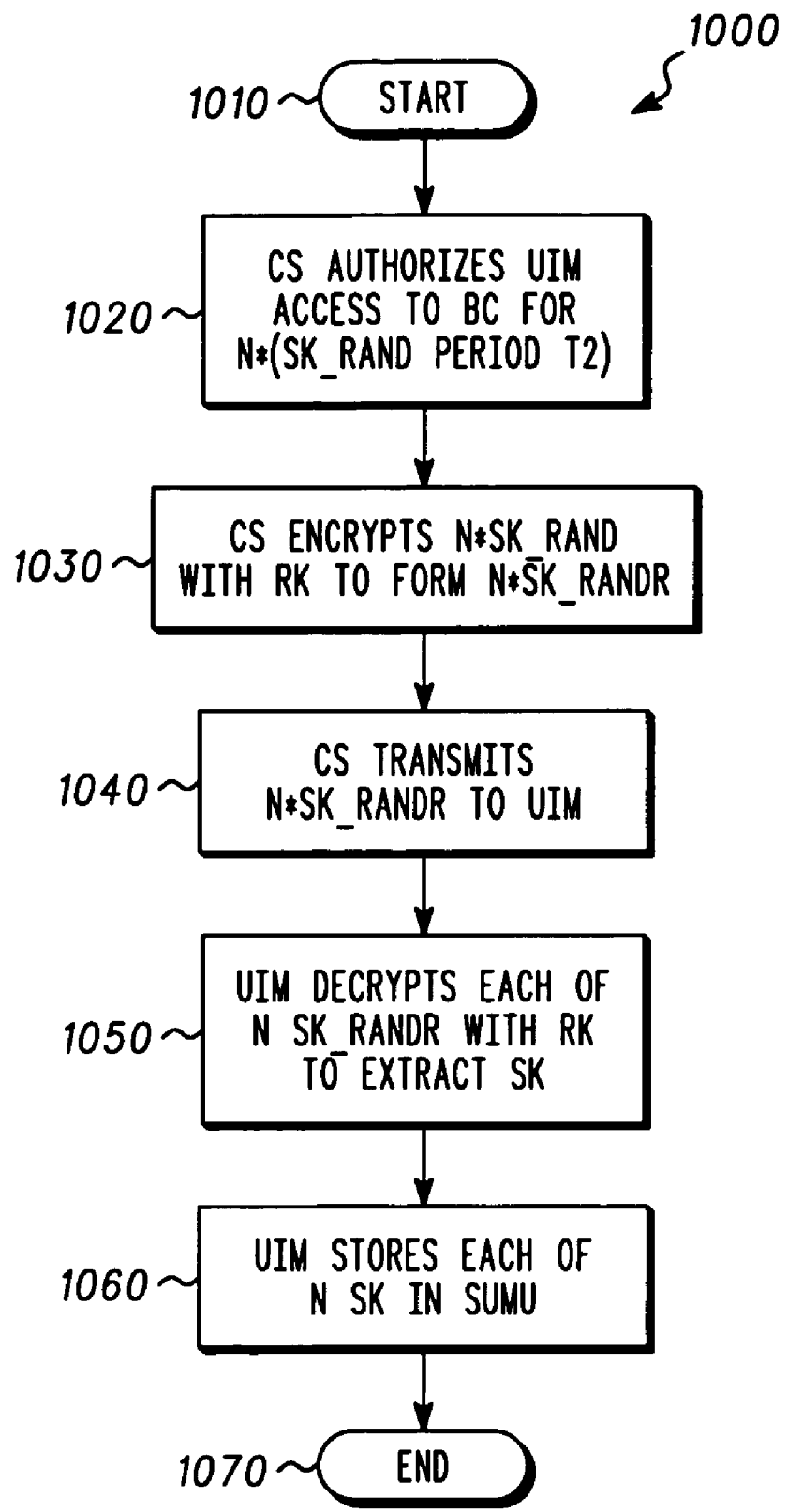
FIG. 10 is an exemplary flowchart outlining the operation of providing preliminary short time updated key information according to one embodiment.

FIG. 10 is an exemplary flowchart 1000 outlining the operation of providing a preliminary short time updated key information according to one embodiment. In step 1010, the flowchart 1000 begins. In step 1020, content server authorizes the UIM 208 access to broadcast content for a limited period. For example, the content server can authorize the UIM access to broadcast content for a specified number N of periods T2 illustrated in FIG. 13. In step 1030, the content server can encrypt a number N of SK_RAND's with RK to form a number N of SK_RANDR's or a number of SKI_BR's which can be similar to SKI_B.

Here, the variable used for calculating the SK is referred to as SK_RANDR, which is updated periodically having a time period T2. As mentioned above, a timer t2 is initiated when the SK_RANDR is generated and times out at T2. In one embodiment, the SK is further updated periodically having a period of T3. A timer t3 is initiated when each SK is generated and times out at time T3. The SK_RANDR is generated at the content server and provided periodically to the communication device 200. The communication device 200 and the content server use SK_RANDR to generate the SK.

In step 1040, the content server transmits the N values of SK_RANDR to the UIM 208. In step 1050, the UIM 208 decrypts each of the N SK_RANDR's with RK to extract each SK. In step 1060, the UIM 208 stores each of the N SK's in the SUMU 214. In step 1070, the flowchart 1000 ends.

Figure 11:
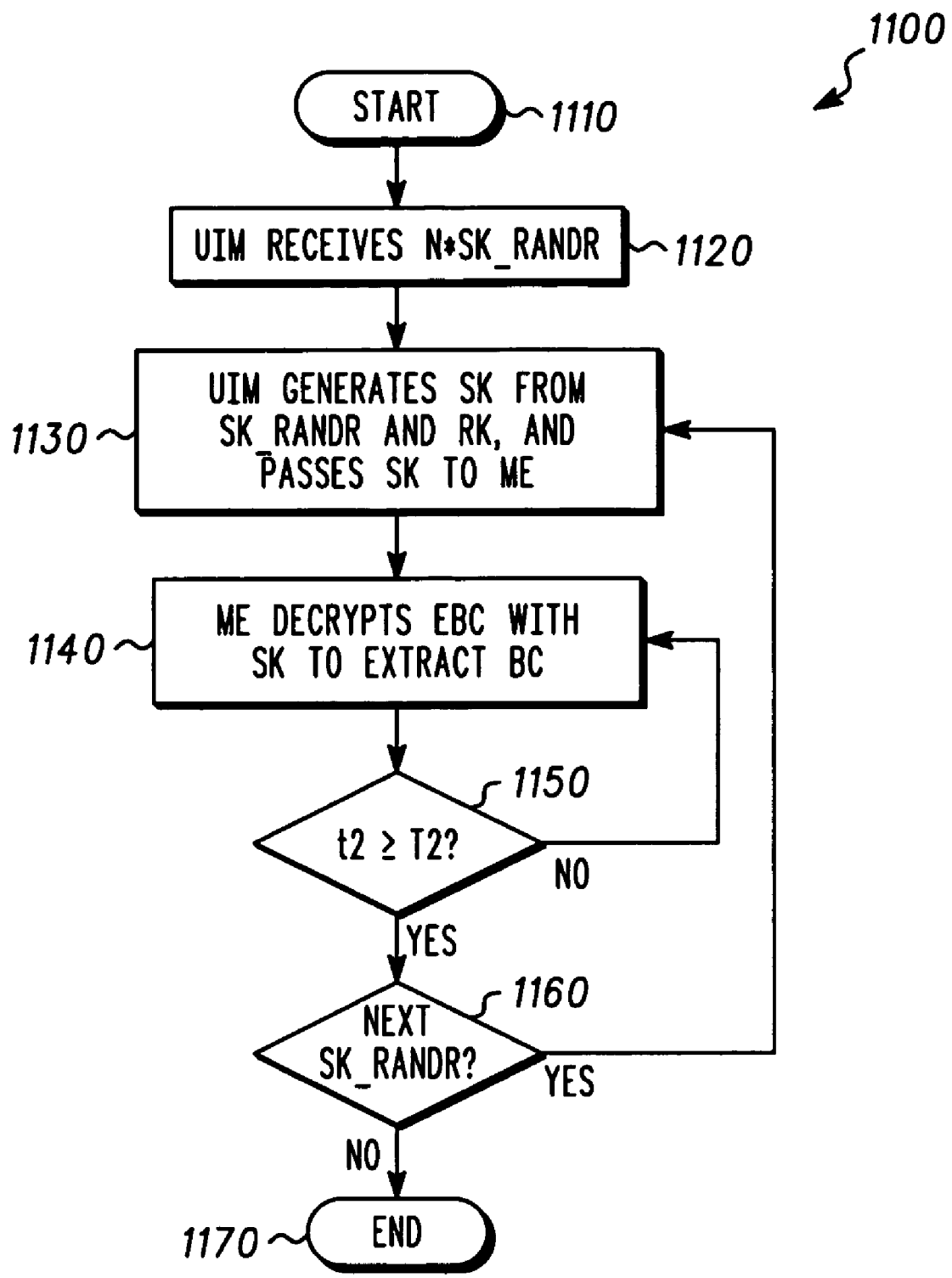
FIG. 11 is an exemplary flowchart outlining a method of updating keys in a communication device according to another embodiment.

FIG. 11 is an exemplary flowchart 1100 outlining a method of updating keys in a communication device 200 according to another embodiment. In step 1110, the flowchart begins. In step 1120, the UIM 208 receives a number N of SK_RANDR's. In step 1130, the UIM 208 generates a current SK from a current SK_RANDR using RK and passes each SK to the ME 206. In step 1140, the ME 206 decrypts the encrypted broadcast content using the SK to extract the unencrypted broadcast content. In step 1150, the communication device 200 determines if the time period for the current SK_RANDR and/or current SK is completed. If not, the ME 206 continues decrypting the encrypted broadcast content using the current SK. If so, the communication device 200 determines if there is another SK_RANDR available for the next period. If so, the communication device 200 returns to step 1130 for the next SK_RANDR. If not, the flowchart ends in step 1170 and the communication device 200 can no longer decrypt the encrypted broadcast content using the available SK_RANDR's. Alternately, the communication device 200 may request additional SK_RANDR's. Also, the communication device 200 may have received a current BAK while decrypting the broadcast content using the SK_RANDR's. If so, the communication device 200 can continue to decrypt the encrypted broadcast content according to the flowchart 800.

Figure 12:
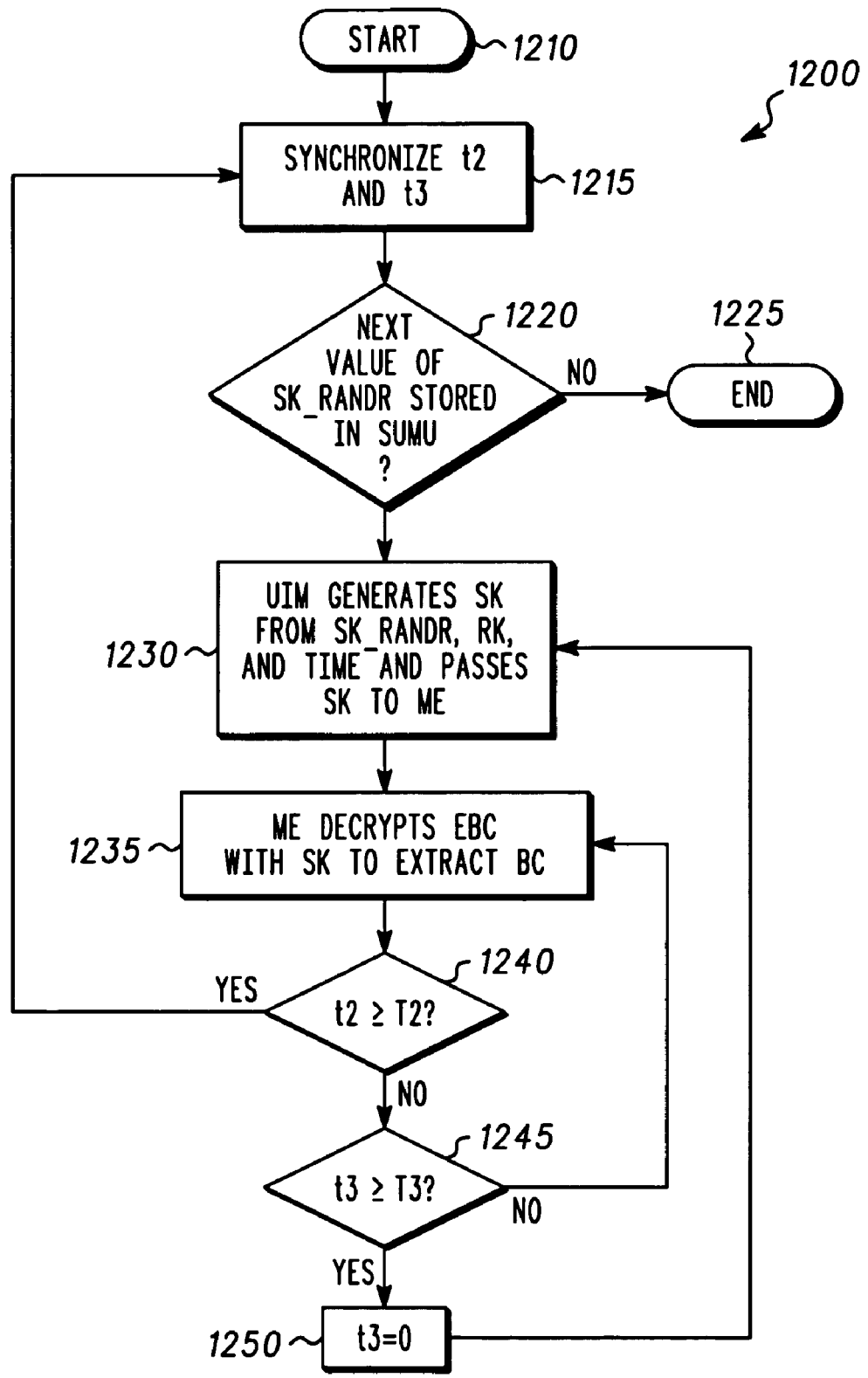
FIG. 12 is an exemplary flowchart outlining the operation of a communication device according to one embodiment.

FIG. 12 is an exemplary flowchart 1200 outlining the operation of the communication device 200 when accessing a broadcast service using preliminary short time updated key information according to one embodiment. In step 1210, the flowchart 1200 begins. In step 1215, the timers t2 and t3 are synchronized with the values at the content server. In step 1220, the communication device 200 determines if the next value of SK_RANDR is stored in the SUMU 214. If not, the flowchart ends in step 1225. If so, in step 1230, the UIM 208 generates the SK using the SK_RANDR, RK, and a time measurement and passes the SK to the ME 206 of the communication device 200. The ME 206 then decrypts the received encrypted broadcast content (EBC) using the SK to extract the original broadcast content (BC) in step 1235. When the timer t2 expires in step 1240, processing returns to step 1215. While the timer t2 is less than T2, if the timer t3 expires at step 1245, the timer t3 is initialized at step 1250 and returns to 1230, otherwise, the flowchart 1200 returns to step 1235.

During the process of flowchart 1200, a user may indicate a desire to pay for a service being previewed. If so, the content server can provide the BAK to the communication device 200 and the flowcharts 600, 700, and 800 can be used. Also, during the process of flowchart 1200, the content server may provide the user with a BAK. For example, this may take place when the SK_RANDR was originally provided for temporary access, such as during authentication of the user's payment method. Again, the content server can then provide the BAK to the communication device 200 and the flowcharts 600, 700, and 800 can be used.

Figure 13:
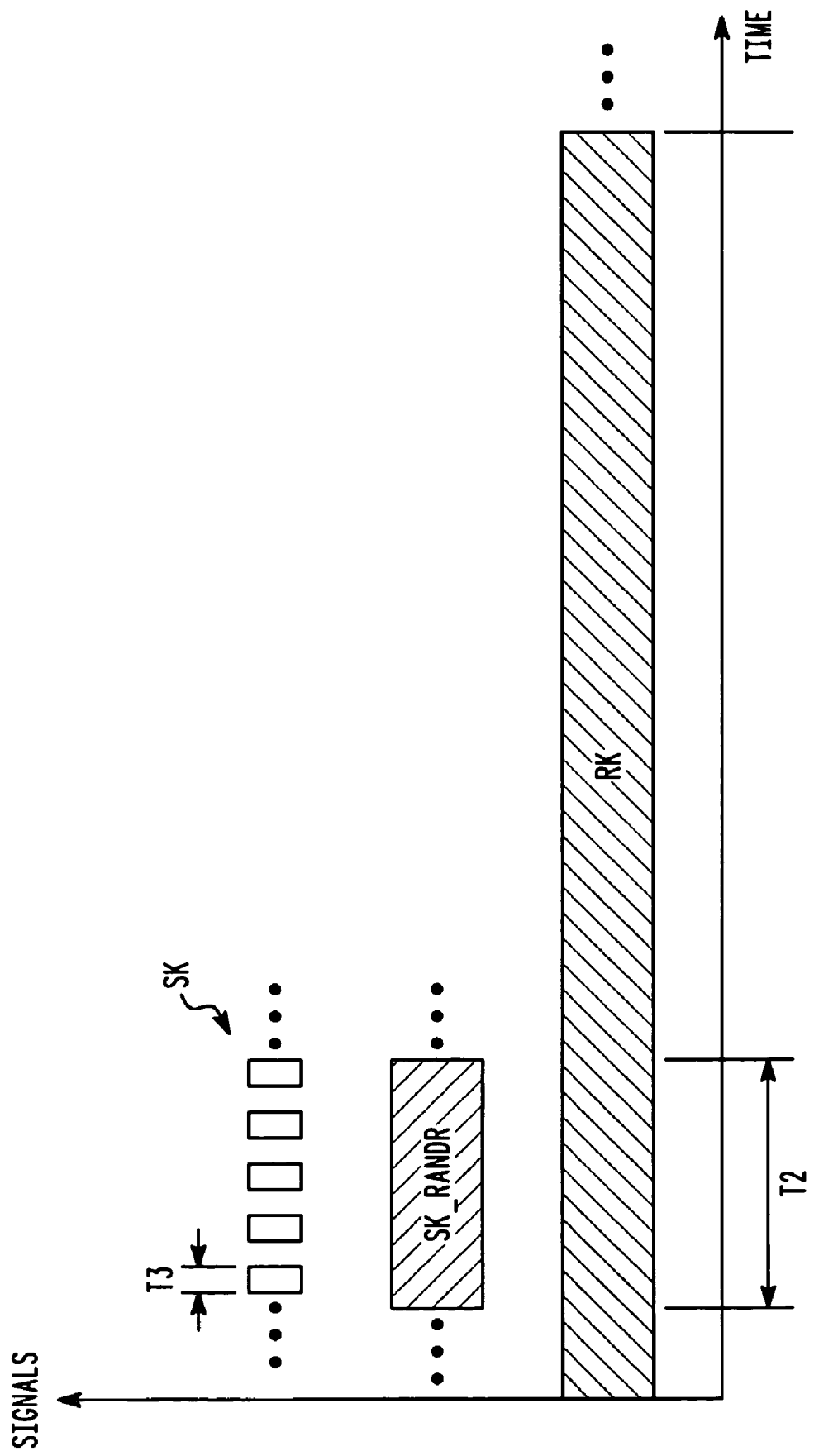
FIG. 13 is an exemplary illustration of time periods for the operation of the disclosed system according to another embodiment.

FIG. 13. is an exemplary timeline. The RK exists in the communication device 200. A variable is used for calculating the SK referred to as SK_RANDR, which is updated periodically having a time period T2. A timer t2 is initiated when the SK_RANDR is generated and times out at T2. In one embodiment, the SK is further updated periodically having a period of T3. A timer t3 is initiated when each SK is generated and time out at time T3. The SK_RANDR is generated at the content server and provided periodically to the communication device 200. The communication device 200 and the content server use SK_RANDR to generate the SK, as detailed below.

Figure 14:
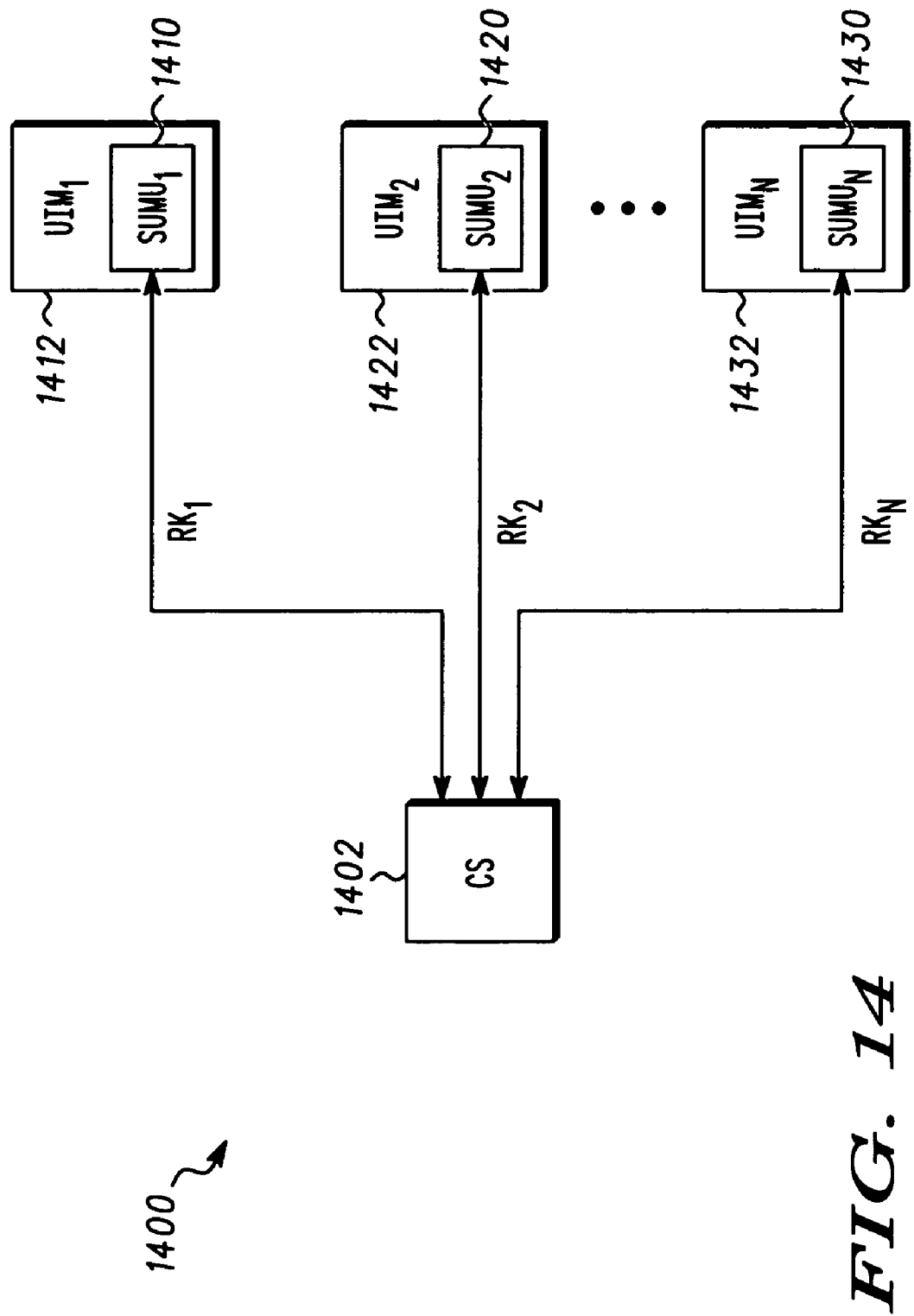
FIG. 14 is an exemplary illustration of the registration process in a wireless communication system according to one embodiment.

FIG. 14 is an exemplary illustration of the registration process in a wireless communication system 1400 according to one embodiment. The wireless communication system 1400 may be a portion of the system 100. In operation, the content server 1402 negotiates with each subscriber UIM 1412, 1422, and 1432, to generate a specific RK to each of the subscribers. The RK is provided to the SUMU unit 1410, 1420, and 1430 within the UIM of each communication device. As illustrated, the content server 1402 generates $RK_1$ which is stored in $SUMU_1$ 1410 within $UIM_1$ 1412. Similarly, the content server 1402 generates $RK_2$ and $RK_N$ which are stored in $SUMU_2$ 1420 within $UIM_2$ 1422 and $SUMU_N$ 1430 within $UIM_N$ 1432, respectively.

Figure 15:
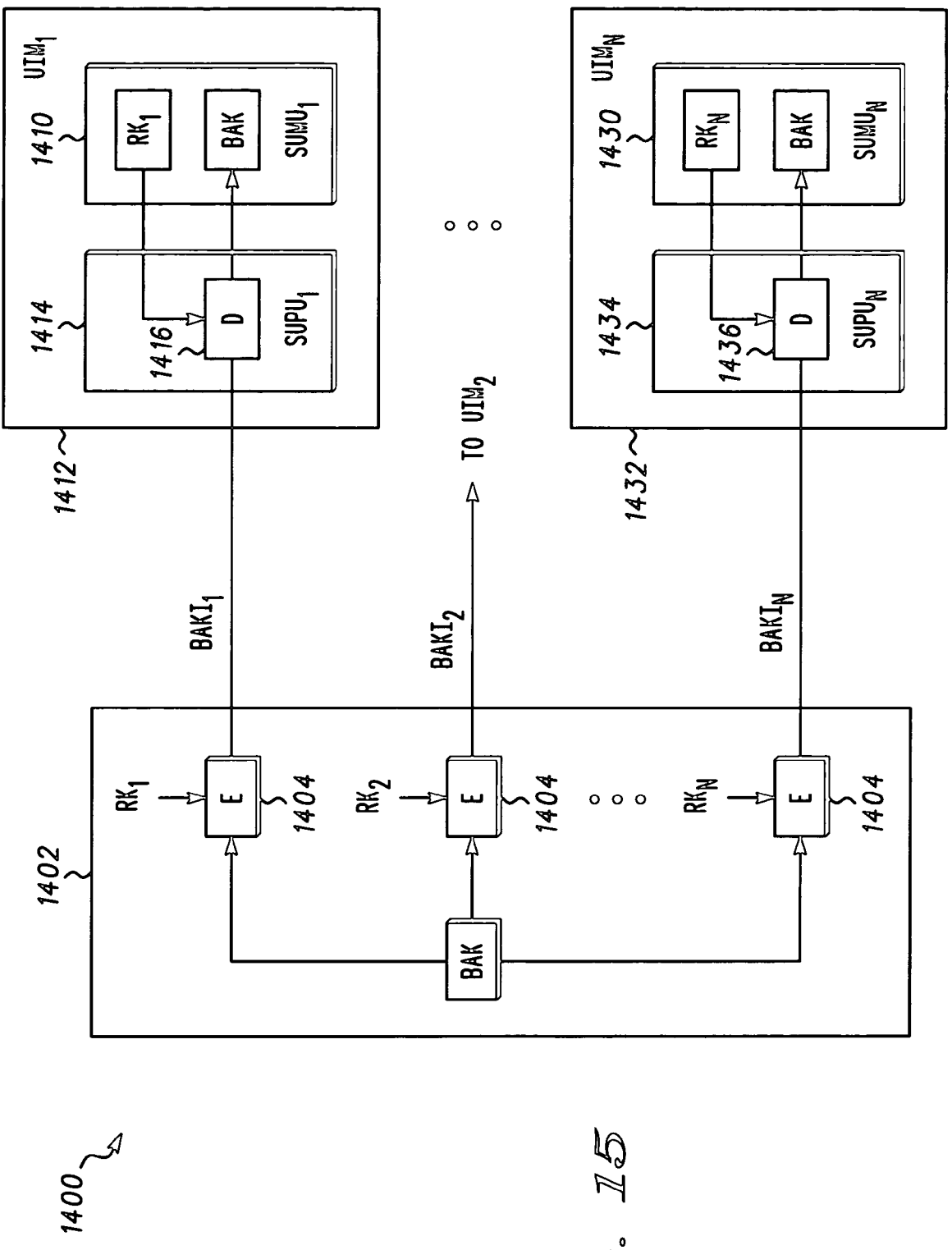
FIG. 15 is an exemplary illustration the subscription process in a system according to on embodiment.

FIG. 15 is an exemplary illustration of the subscription process in the system 1400 according to one embodiment. The content server 1402 can include multiple encoders 1404. Each of the encoders 1404 receives one of the unique RKs for each subscriber UIM 1412 and 1432 and the BAK value generated in the content server 1402. The output of each encoder 1404 is a BAKI encoded specifically for a subscriber. The BAKI is received at the UIM of each subscriber communication device, such as UIM, 1412. Each UIM includes a SUPU and a SUMU, such as $SUPU_1$ 1414 and $SUMU_1$ 1410 of $UIM_1$ 1412 and $SUPU_N$ 1434 and $SUMU_N$ 1430 of $UIM_N$ 1432. The SUPU includes a decoder, such as decoders 1416 and 1436 that recovers the BAK by application of the RK of the UIM. The process is repeated at each subscriber.

Figure 16:
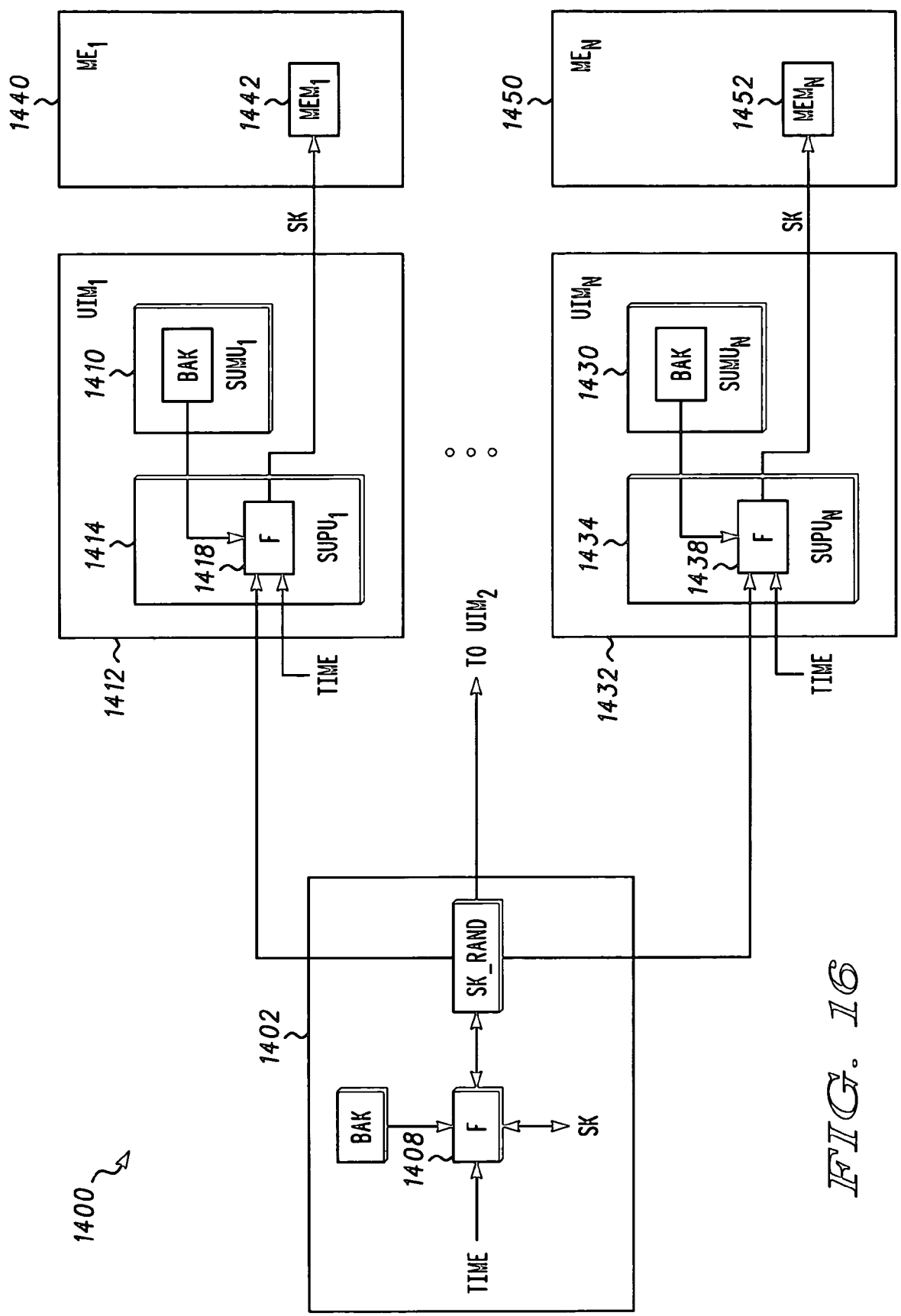
FIG. 16 is an exemplary illustration of key management and updates in a system according to one embodiment.

FIG. 16 is an exemplary illustration of key management and updates in the system 1400 according to one embodiment. In operation, the content server 1402 applies a function 1408 to generate a value of SK_RAND, which is the transmitted value used by the content server 1402 and a communication device to calculate SK. The function 1408 can apply the BAK value, the SK_RAND and a time factor. While the embodiment illustrated in FIG. 16 applies a timer to determine when to update the SK, alternate embodiments may use alternate measures to provide periodic updates, for example occurrence of an error or other event. The content server provides the SK_RAND value to each of the subscribers, wherein a function 1418 and 1438 resident in each UIM applies the same function as in function 1408 of the content server. The function 1418 operates on the SK_RAND, BAK and a timer value to generate a SK that is stored in a memory location in the respective ME, such as $MEM_1$ 1442 of $ME_1$ 1440.

Figure 17:
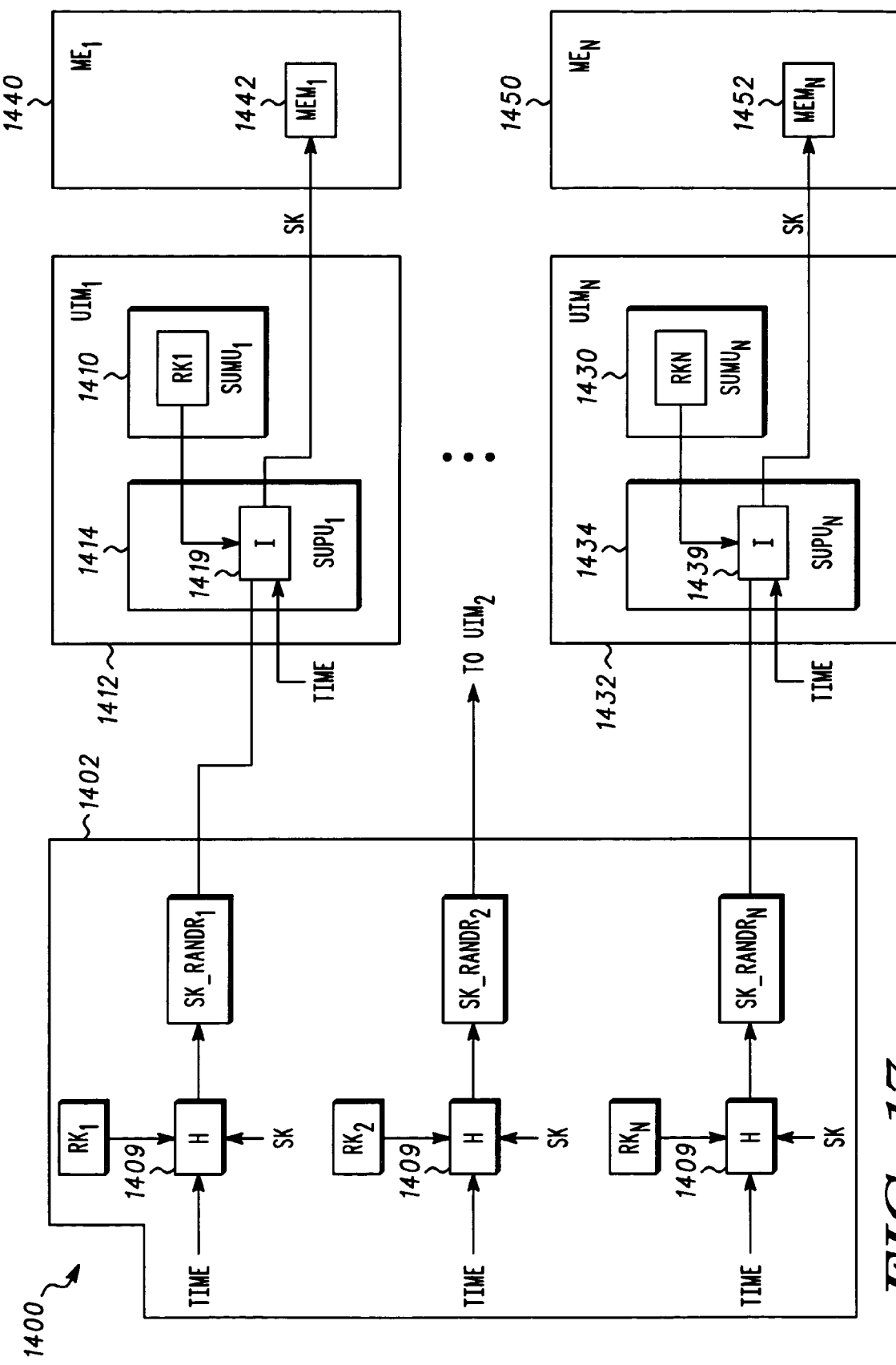
FIG. 17 is an exemplary illustration of key management for a preliminary short time updated key in a system according to one embodiment.

FIG. 17 is an exemplary illustration of key management for a preliminary short time updated key in the system 1400 according to one embodiment. In operation, the content server 1402 applies a function 1409 to generate a value of SK_RANDR, which is the transmitted value used by the content server and communication device to calculate SK during a preview period, authentication period, or the like, without sending the BAK. Specifically, the function 1409 applies the RK value, the SK_RANDR and a time factor for each communication device to calculate the short time updated key SK. While the embodiment illustrated in FIG. 17 applies a timer to determine when to update the SK, alternate embodiments may use alternate measures to provide periodic updates, for example occurrence of an error or other event. Also, the content server 1402 can generate the SK without using the SK_RANDR. The content server 1402 provides each separate SK_RANDR value to each of the separate subscribers, respectively, wherein a function, such as function 1419 and 1439, resident in each UIM applies the same function as in function 1408 of the content server. The function 1419 operates on the SK_RAND, RK and a timer value to generate a SK that is stored in a memory location in the respective ME, such as $MEM_1$ 1442 of $ME_1$ 1440.

Figure 18:
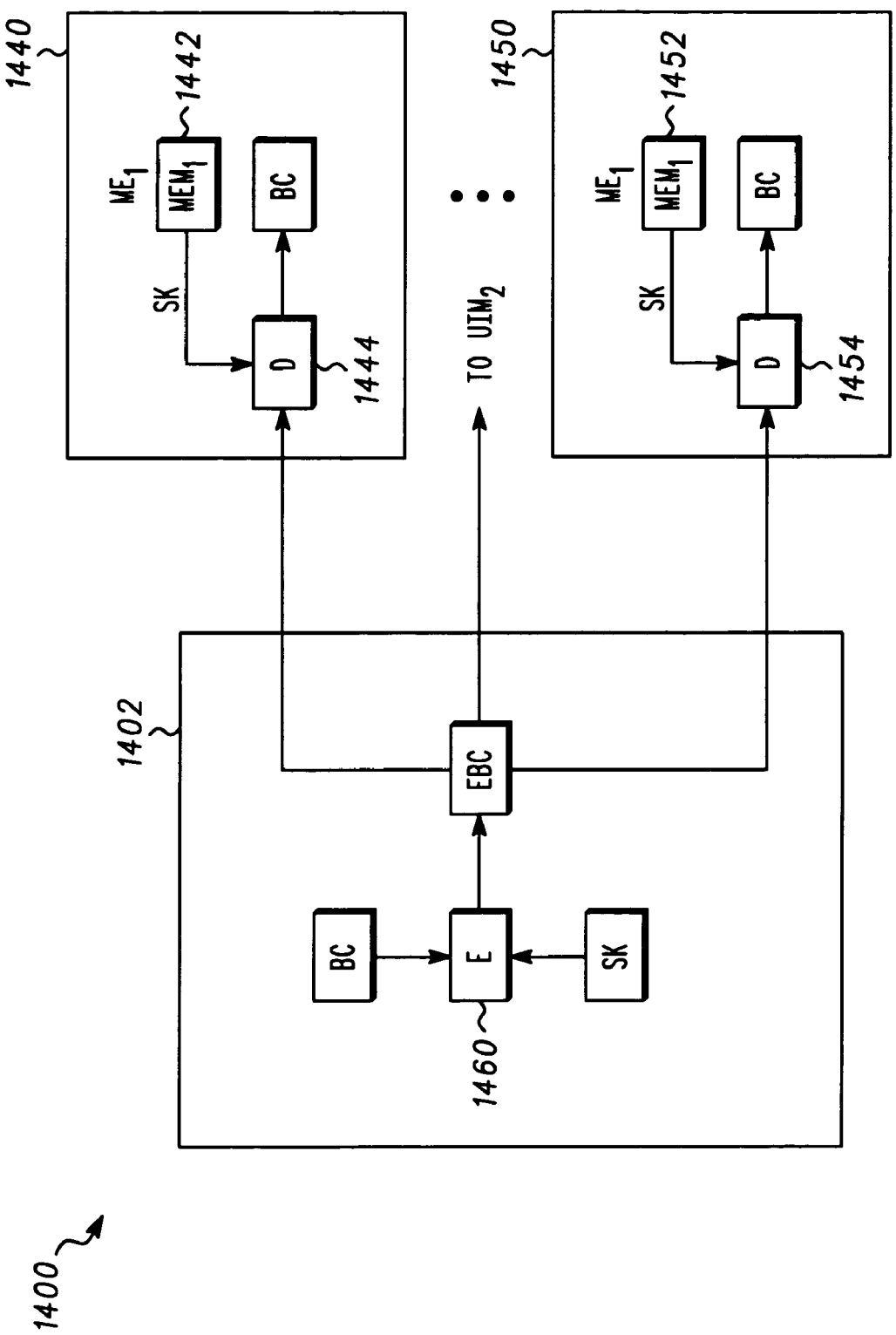
FIG. 18 is an exemplary illustration of the processing of broadcast content after registration and subscription in the system according to one embodiment.

FIG. 18 is an exemplary illustration of the processing of BC after registration and subscription in the system 1400 according to one embodiment. The content server 1402 includes an encoder 1460 that encodes the BC using the current SK to generate the EBC. The EBC is then transmitted to the subscribers. Each subscriber communication device includes a decoder, such as decoders 1444 and 1454, which extracts the BC from the EBC using the SK.

While many of the preceding features have been described with respect to operations of a content server 1402, it is understood that different functions may also be performed at other places in the system 100. For example, functions such as registration key (RK) generation, encryption, and/or transmission, broadcast subscription key (BAK) generation, encryption, and/or transmission, and other key or data generation, encryption, and/or transmission, may be performed at other locations, such as within the controller 140, within a base station controller on the network 110, or at any other useful place in the system 100. For example, a base station controller may generate and distribute a short time updated key (SK).

While the present disclosure has been described with respect to an exemplary embodiment of a wireless communication system supporting a uni-directional broadcast service, the encryption methods and key management described hereinabove is further applicable to other data processing systems, including a multi-cast type broadcast system. Still further, the present disclosure can be applied to any data processing system wherein multiple subscribers access a single transmission of secure information through an insecure channel.

The method of this invention is preferably implemented on a programmed processor. However, the disclosed processors and processes may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the invention by simply employing the elements of the independent claims. Accordingly, the preferred embodiments of the invention as set forth herein are intended to be illustrative, not limiting. Various changes may be made without departing from the spirit and scope of the invention.

What is claimed is:

1. A method for encrypted broadcast services reception, comprising:
   requesting a broadcast services transmission;
   receiving preliminary preview key information prior to receiving a broadcast subscription key for the requested broadcast services transmission;
   receiving an encrypted broadcast services transmission; and
   decrypting the encrypted broadcast services transmission using the preliminary preview key information prior to receiving the broadcast subscription key.

2. The method according to claim 1, further comprising:
   receiving the broadcast subscription key;
   receiving short time updated key information;

determining a short time updated key using the broadcast subscription key and the short time updated key information;

receiving the encrypted broadcast services transmission; and decrypting the encrypted broadcast services transmission using the short time updated key, wherein at least decrypting the encrypted broadcast services transmission using the short time updated key is performed after decrypting the encrypted broadcast services transmission using the preliminary preview key information.

3. The method according to claim 2, wherein the steps of claim 2 are performed in response to a user agreeing to pay for the broadcast services transmission.

4. The method according to claim 2, wherein the steps of claim 2 are performed in response to authorizing a user for reception of the broadcast services transmission.

5. The method according to claim 1, wherein the preliminary preview key information includes an encrypted short time updated key.

6. The method according to claim 5.

wherein the method further comprises decrypting the encrypted short time updated key using a registration key to obtain a decrypted short time updated key, and wherein the step of decrypting the encrypted broadcast services transmission using the preliminary preview key information comprises decrypting the encrypted broadcast services transmission using the decrypted short time updated key.

7. The method according to claim 1, wherein the preliminary preview key information comprises an unencrypted short time updated key.

8. The method according to claim 1, wherein the preliminary preview key information comprises an unencrypted preliminary preview key.

9. The method according to claim 1, wherein the preliminary preview key information comprises an encrypted preliminary preview key.

10. The method according to claim 1, wherein requesting a broadcast services transmission further comprises requesting a preview broadcast services transmission.

11. The method according to claim 1, wherein the preliminary preview key information comprises multiple sets of preliminary preview key information to allow decryption of the encrypted broadcast services transmission for a predetermined time period.

12. The method according to claim 1, wherein the preliminary preview key information is original preliminary preview key information, and wherein the method further comprises:

determining the original preliminary preview key information is at least one of expired and about to expire; and requesting additional preliminary preview key information to continue decrypting the encrypted broadcast services transmission using the additional preliminary preview key information after the original preliminary preview key information has expired.

13. A method for encrypted broadcast services transmission, comprising:

receiving a request for a broadcast services transmission;

transmitting a preliminary preview key information prior to transmitting a broadcast subscription key for the requested broadcast services transmission, the preliminary preview key information configured to allow a user to decrypt an encrypted broadcast services transmission for a limited time prior to the user receiving a broadcast subscription key to decrypt the encrypted broadcast services transmission;

transmitting the encrypted broadcast services transmission;

authorizing a user to receive the broadcast services transmission after transmitting the preliminary preview key information; and transmitting the broadcast subscription key in response to authorizing the user to receive the broadcast services transmission.

14. The method according to claim 13, further comprising:

transmitting short time updated key information, the short time updated key information including a broadcast subscription key element and a short time updated key element, wherein the encrypted broadcast services transmission is encrypted using the short time updated key element.

15. The method according to claim 14, wherein authorizing the user to receive the broadcast services transmission includes authorizing the user based on the user agreeing to pay for the broadcast services transmission.

16. The method according to claim 14, wherein authorizing the user to receive the broadcast services transmission includes authorizing the user based on authorizing the user's payment method for the broadcast services transmission.

17. The method according to claim 13, wherein the preliminary preview key information includes an encrypted short time updated key.

18. The method according to claim 17, wherein the method further comprises encrypting the short time updated key using a registration key to obtain the preliminary preview key information.

19. The method according to claim 13, wherein the preliminary preview key information comprises an unencrypted short time updated key.

20. The method according to claim 13, wherein the preliminary preview key information comprises an unencrypted preliminary preview key.

21. The method according to claim 13, wherein receiving a request for a broadcast services transmission further comprises receiving a request for a preview broadcast services transmission.

22. The method according to claim 13, wherein the preliminary preview key information comprises multiple sets of preliminary preview key information to allow decryption of the encrypted broadcast services transmission for a predetermined time period.

23. The method according to claim 13, wherein the preliminary preview key information is original preliminary preview key information, and wherein the method further comprises:

receiving a request for additional preliminary preview key information;

determining if a preview period is about to expire; and sending additional preliminary preview key information if the preview period is not about to expire.

24. The method according to claim 13, wherein the preliminary preview key information is original preliminary preview key information, and wherein the method further comprises:

determining the original preliminary preview key is about to expire; and sending additional preliminary preview key information if the preliminary preview key is about to expire.

25. An apparatus for encrypted broadcast services reception, comprising:
- a transmitter configured to request a broadcast services transmission;
- a receiver configured to receive preliminary preview key information prior to receiving a broadcast subscription key for the requested broadcast services transmission, the receiver also configured to receive an encrypted broadcast services transmission;
- a user identification module including a secure user identification module memory unit configured to securely store the broadcast subscription key and a registration key; and
- a processor configured to decrypt the encrypted broadcast services transmission using the preliminary preview key information prior to receiving the broadcast subscription key.

26. The apparatus according to claim 25,
- wherein the receiver is further configured to receive the broadcast subscription key and receive short time updated key information,
- wherein the user identification module further includes a secure user identification module processing unit configured to determine a short time updated key using the broadcast subscription key and the short time updated key information, and
- wherein the processor is further configured to decrypt the encrypted broadcast services transmission using the short time updated key.

27. The apparatus according to claim 25, wherein the preliminary preview key information includes an encrypted short time updated key.

28. The apparatus according to claim 27,
- wherein the user identification module further includes a secure user identification module processing unit configured to decrypt the encrypted short time updated key information using the registration key to obtain a decrypted short time updated key, and
- wherein the processor is further configured to decrypt the encrypted broadcast services transmission using the preliminary preview key information by decrypting the encrypted broadcast services transmission using the decrypted short time updated key.

29. The apparatus according to claim 25, wherein the preliminary preview key information comprises an unencrypted short time updated key.

30. The apparatus according to claim 25, wherein the preliminary preview key information comprises an unencrypted preliminary preview key.

31. The apparatus according to claim 25, wherein the preliminary preview key information comprises multiple sets of preliminary preview key information to allow decryption of the encrypted broadcast services transmission for a predetermined time period.

32. The apparatus according to claim 25,
- wherein the preliminary preview key information is original preliminary preview key information, and
- wherein the processor is further configured to determine the original preliminary preview key information is at least one of expired and about to expire and request additional preliminary preview key information to continue decrypting the encrypted broadcast services transmission using the additional preliminary preview key information after the original preliminary preview key information has expired.

* * * * *